United States Patent
Takano et al.

(10) Patent No.: US 9,767,280 B2
(45) Date of Patent: Sep. 19, 2017

(54) INFORMATION PROCESSING APPARATUS, METHOD OF CONTROLLING THE SAME, INFORMATION PROCESSING SYSTEM, AND INFORMATION PROCESSING METHOD

(71) Applicant: Canon Denshi Kabushiki Kaisha, Chichibu-shi, Saitama-ken (JP)

(72) Inventors: Kazuki Takano, Saitama-ken (JP); Satoshi Yonekawa, Saitama (JP); Azusa Sekiguchi, Funabashi (JP); Tomonori Sato, Fujisawa (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 243 days.

(21) Appl. No.: 14/664,410

(22) Filed: Mar. 20, 2015

(65) Prior Publication Data

US 2015/0193618 A1 Jul. 9, 2015

Related U.S. Application Data

(63) Continuation of application No. PCT/JP2013/006022, filed on Oct. 9, 2013.

(30) Foreign Application Priority Data

Oct. 9, 2012 (JP) .................. 2012-224574
Oct. 9, 2012 (JP) .................. 2012-224575
(Continued)

(51) Int. Cl.
*G06F 21/00* (2013.01)
*G06F 21/55* (2013.01)
(Continued)

(52) U.S. Cl.
CPC .............. *G06F 21/554* (2013.01); *G06F 8/61* (2013.01); *G06F 8/65* (2013.01); *G06F 9/445* (2013.01);
(Continued)

(58) Field of Classification Search
None
See application file for complete search history.

(56) References Cited

U.S. PATENT DOCUMENTS 6,799,277 B2 * 9/2004 Colvin .................. G06F 21/121
705/51
6,836,712 B2 12/2004 Nishina ........................... 701/35
(Continued)

FOREIGN PATENT DOCUMENTS

JP S61-131136 A 6/1986
JP H04-157599 5/1992
(Continued)

OTHER PUBLICATIONS

Yukio Sakajo, "Antivirus and Internet Security Software, White Shield", Meiden-Jihou, Meidensha Corporation, Oct. 26, 2009, No. 4, pp. 10-13, with partial translation.

*Primary Examiner* — Maung Lwin
(74) *Attorney, Agent, or Firm* — Fitzpatrick, Cella, Harper & Scinto

(57) ABSTRACT

Startup of a program and generation or change of a program is detected, or a program is searched for. It is determined, based on program information of a program whose startup is detected or a program which is found, whether or not the program meets a predetermined criterion. The program determined to meet the predetermined criterion is registered in a white list or black list.

32 Claims, 20 Drawing Sheets

(30) Foreign Application Priority Data

| Mar. 1, 2013 | (JP) | 2013-041248 |
|---|---|---|
| Oct. 8, 2013 | (JP) | 2013-211423 |
| Oct. 8, 2013 | (JP) | 2013-211424 |

(51) Int. Cl.
*G06F 9/445* (2006.01)
*G06F 21/51* (2013.01)
*H04L 29/06* (2006.01)

(52) U.S. Cl.
CPC .......... *G06F 21/51* (2013.01); *H04L 63/0227* (2013.01); *G06F 2221/2145* (2013.01); *H04L 63/101* (2013.01); *H04L 63/1441* (2013.01)

(56) References Cited

U.S. PATENT DOCUMENTS

| 8,161,552 | B1* | 4/2012 | Sun | G06F 21/566 726/22 |
|---|---|---|---|---|
| 8,321,949 | B1* | 11/2012 | Green | G06F 21/51 707/687 |
| 8,701,192 | B1* | 4/2014 | Glick | G06F 21/566 726/24 |
| 2001/0034712 | A1* | 10/2001 | Colvin | G06F 21/121 705/52 |
| 2006/0272011 | A1* | 11/2006 | Ide | G06F 21/31 726/5 |
| 2007/0250547 | A1 | 10/2007 | Kai et al. | 707/202 |
| 2008/0086776 | A1* | 4/2008 | Tuvell | G06F 21/564 726/24 |
| 2009/0083852 | A1 | 3/2009 | Kuo et al. | 726/22 |
| 2009/0125902 | A1* | 5/2009 | Ghosh | G06F 9/45533 718/1 |
| 2009/0286512 | A1* | 11/2009 | Huber | G06Q 20/1235 455/411 |
| 2009/0293125 | A1* | 11/2009 | Szor | G06F 21/56 726/24 |
| 2010/0082530 | A1 | 4/2010 | Miyamoto | 707/609 |
| 2010/0100939 | A1* | 4/2010 | Mahaffey | G06F 21/30 726/4 |
| 2013/0097708 | A1* | 4/2013 | Jayanthi | G06F 21/554 726/25 |
| 2015/0172150 | A1* | 6/2015 | Ding | H04L 67/42 709/203 |

FOREIGN PATENT DOCUMENTS

| JP | H09-114708 | 5/1997 |
|---|---|---|
| JP | H10-124261 A | 5/1998 |
| JP | 2000-293219 | 10/2000 |
| JP | 2002-157122 | 5/2002 |
| JP | 2003-057076 | 2/2003 |
| JP | 2007-280096 | 10/2007 |
| JP | 2009-259160 A | 11/2009 |
| JP | 2010-009186 | 1/2010 |
| JP | 2010-072984 | 4/2010 |
| JP | 2010-182196 A | 8/2010 |
| JP | 2011-123675 A | 6/2011 |
| JP | 2011-141806 | 7/2011 |
| JP | 2011-252339 A | 12/2011 |
| JP | 2012-185745 A | 9/2012 |
| WO | WO 2012/027588 A1 | 3/2012 |

\* cited by examiner

| PROGRAM NAME | HASH VALUE | VERSION | FILE SIZE | CHAINED ELEVATION PRIVILEGE |
|---|---|---|---|---|
| Iexplore.exe | 72AE6B5FDA794D2 | 1.0.0.1 | 56.3KB | ABSENT |
| svchost.exe | 1A8C6D902A1200B | 2.1 | 1.43MB | ABSENT |
| dwn.exe | A8C6D902A120089 | 10.7.1 | 321.8KB | PRESENT |
| xcel.exe | F41B4C736164DD0 | 4.0 | 214KB | ABSENT |
| inword.exe | 5BC866A3F1C29B8 | 1.10.2 | 2.1MB | ABSENT |
| ... | ... | ... | ... | ... |

FIG. 4

| | | | |
|---|---|---|---|
| 220 | | | |
| PC001 | WHITE LIST 001 | | |
| PC002 | WHITE LIST 002 | | |
| PC003 | WHITE LIST 003 | | |
| ... | ... | | |

| PROCESS NAME | HASH VALUE | REGISTRATION DATE/TIME | LATEST STARTUP DATE/TIME |
|---|---|---|---|
| Iexplore.exe | 72AE685FDA794D2 | 2012/3/4 10:00 | 2012/3/4 11:00 |
| svchost.exe | 1A8C6D902A1200B | 2012/3/5 03:00 | 2012/3/5 10:00 |
| dwn.exe | A8C6D902A120089 | 2012/3/13 10:00 | 2012/3/14 10:00 |
| xcel.exe | F41B4C736164DD0 | 2012/3/21 11:00 | 2012/3/26 10:00 |
| inword.exe | 58C866A3F1C2988 | 2012/3/24 20:00 | 2012/4/1 10:00 |

FIG. 9

| PROGRAM NAME | HASH VALUE | VERSION | FILE SIZE | CHAINED ELEVATION PRIVILEGE | CONNECTION DESTINATION IP | CONNECTION DESTINATION PORT |
|---|---|---|---|---|---|---|
| lexplore.exe | 72AE6B5FDA794D2 | 1.0.0.1 | 56.3KB | ABSENT | xxx.111.111.111 | 80 |
| svchost.exe | 1A8C6D902A120OB | 2.1 | 1.43MB | ABSENT | xxx.111.111.112 | 80 |
| dwn.exe | A8C6D902A1200B9 | 10.7.1 | 321.8KB | PRESENT | — | — |
| xcel.exe | F41B4C736164DD0 | 4.0 | 214KB | ABSENT | xxx.111.111.114 | 8080 |
| inword.exe | 5BC866A3F1C29B8 | 1.10.2 | 2.1MB | ABSENT | xxx.111.111.115 | 80 |
| ... | ... | ... | ... | ... | ... | ... |

FIG. 10

| | PROCESS NAME | HASH VALUE | CONNECTION DESTINATION IP | CONNECTION DESTINATION PORT | REGISTRATION DATE/TIME | LATEST STARTUP DATE/TIME |
|---|---|---|---|---|---|---|
| | Iexplore.exe | 72AE6B5FDA794D2 | xxx.111.111.111 | 80 | 2012/3/4 10:00 | 2012/3/4 11:00 |
| | svchost.exe | 1A8C6D902A1200B | xxx.111.111.112 | 80 | 2012/3/5 03:00 | 2012/3/5 10:00 |
| | dwn.exe | A8C6D902A1200B9 | — | — | 2012/3/13 10:00 | 2012/3/14 10:00 |
| | xcel.exe | F41B4C736164DD0 | xxx.111.111.114 | 8080 | 2012/3/21 11:00 | 2012/3/26 10:00 |
| | inword.exe | 5BC866A3F1C29B8 | xxx.111.111.115 | 80 | 2012/3/24 20:00 | 2012/4/1 10:00 |

| 220 | |
|---|---|
| PC001 | WHITE LIST 001 |
| PC002 | WHITE LIST 002 |
| PC003 | WHITE LIST 003 |
| ... | ... |

F I G. 16

| PROCESS NAME | PROCESS ID | FILE NAME | HASH VALUE | FILE PATH | SIGNATORY NAME | CREATOR NAME | CREATION COMPANY NAME |
|---|---|---|---|---|---|---|---|
| TestA.exe | 100 | A.exe | 72ABC758... | C:\test\A.exe | A Sign | ABC | ABC Inc. |
| TestB.exe | 200 | B.exe | 1AFC412... | C:\test\B.exe | Sign B | BCD | BCD Inc. |
| TestC.exe | 300 | C.exe | EFD1C32... | C:\test\C.exe | A Sign | CDE | ABC Inc. |
| ... | ... | ... | ... | ... | ... | ... | ... |

INFORMATION PROCESSING APPARATUS, METHOD OF CONTROLLING THE SAME, INFORMATION PROCESSING SYSTEM, AND INFORMATION PROCESSING METHOD

This application is a continuation of International Patent Application No. PCT/JP2013/006022 filed on Oct. 9, 2013, and claims priority to Japanese Patent Application Nos. 2012-224574 and 2012-224575 filed Oct. 9, 2012, Japanese Patent Application No. 2013-041248 filed Mar. 1, 2013, and Japanese Patent Application Nos. 2013-211423 and 2013-211424 filed Oct. 8, 2013, the entire content of which are incorporated herein by reference.

TECHNICAL FIELD

The present invention relates to an information processing apparatus, an information processing system, and an information processing method for controlling permission/prohibition of startup of a program and controlling network access.

BACKGROUND ART

A recently increasing new form of cyber attack affecting companies is a targeted attack that infects a target computer used or owned by a specific employee of a company with malware and steals information from the company.

Conventional antivirus software uses a virus definition file using a black list method. However, the number of types of malware containing computer viruses is increasing by the ten thousands a day. It is therefore impossible to keep up with the abrupt increase in the number of malware types by updating the virus definition software. Hence, it is difficult to cope with a targeted attack by conventional antivirus software.

On the other hand, there exists a measure against a targeted attack using a so-called white list type control method that allows execution of known programs and restricts execution of the remaining programs. When updating a program in a computer using the white list type control method, an updater program used for updating is registered in the white list.

However, the updater normally generates a plurality of other execution files in many cases. Hence, even when the updater is registered in the white list, the execution files generated by the updater are not registered in the white list. As a result, if the execution files generated by the updater are installed in the computer, and the update completed, it may be impossible to start the execution files and normally operate the updated program.

There also exists a measure against a targeted attack using a so-called white list type network access control that allows network access by known programs and restricts network access by a program included in the remaining programs.

When starting white list type network access control, a program to be permitted is registered in the white list. However, if an update is performed by, for example, applying a security patch, the previously registered white list permitted program is updated and no longer matches the registration, and the updated program needs to be re-registered in the white list. In addition, if a program is newly generated by an updater, it is necessary to register the newly generated program as well.

A system administrator or the like conventionally performs an operation of extracting an execution file generated by an updater and registering it in a white list or an operation of registering an updated program or a program generated by an updater in a white list every time an update is performed. According to these methods, it is necessary to do burdensome operations, for example, not only an operation of determining whether an updater is reliable but also an operation of registering an updated program or generated program in a white list and an operation of extracting an execution file and updating the white list.

SUMMARY OF INVENTION

According to an aspect, an information processing apparatus comprising: a detection unit configured to detect startup of a program and generation or change of a program, or search for a program; an identification unit configured to identify a program; and a registration unit configured to register a program in a white list or black list, wherein the identification unit determines, based on program information of a program whose startup is detected by the detection unit or a program which is found in the search by the detection unit, whether or not the program meets a predetermined criterion regarding program information, and the registration unit registers, in the white list or black list, the program determined to meet the predetermined criterion.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 3 is a view showing an example of a white list.

FIG. 4 is a view showing an example of a white list master existing in a server.

FIG. 9 is a view showing an example of a white list according to the second embodiment.

FIG. 10 is a view showing an example of a white list master according to the second embodiment existing in a server.

FIG. 16 is a view showing an example of a list in which a registration program registers information.

DESCRIPTION OF EMBODIMENTS

An information processing apparatus and a method of controlling the same, an information processing system, and an information processing method according to the embodiments of the present invention will now be described in detail with reference to the accompanying drawings.

First Embodiment

[System Arrangement]

Figure 1:
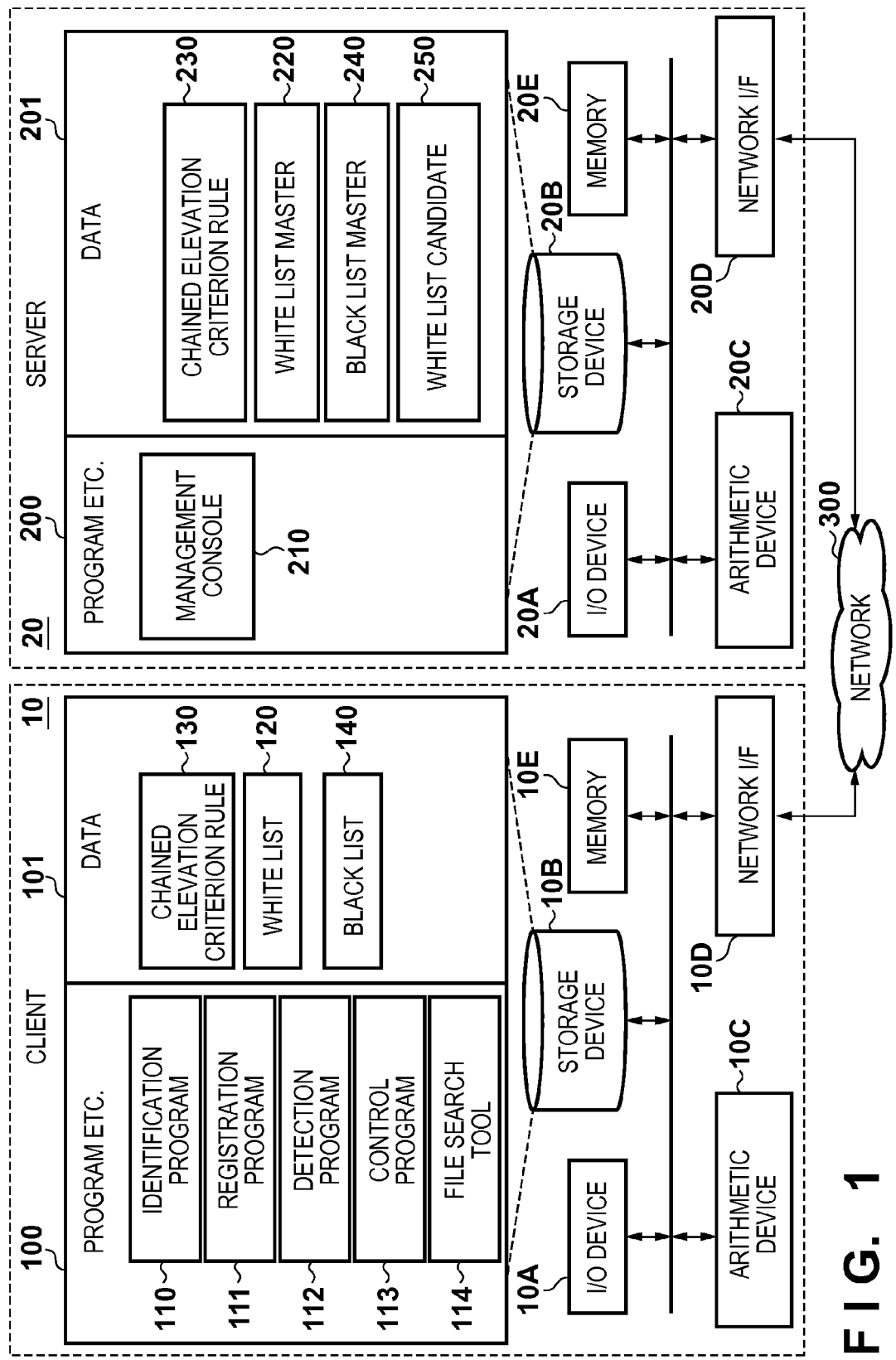
FIG. 1 is a block diagram showing the arrangement of a white list control system according to the first embodiment.

FIG. 1 is a block diagram showing the arrangement of a white list control system. The white list control system includes an information processing apparatus and a server apparatus that manages the information processing apparatus.

Referring to FIG. 1, a client computer (to be referred to as a "client" hereinafter) 10 is an information processing apparatus in the white list control system. The client 10 is, for example, a personal computer (PC) set up in a company, school, administrative organ, or home or a computer device such as a tablet terminal or smartphone used or owned by an individual.

A server computer (to be referred to as a "server" hereinafter) 20 is a server apparatus that manages the information processing apparatus in the white list control system. The server 20 acquires information of a white list 120 from a plurality of clients 10 and forms a database, or periodically transmits white list data to the client 10 and updates the white list 120.

A network 300 is a computer network such as the Internet or an intranet. The client 10 is connected to the server 20 or a web server or FTP (File Transfer Protocol) server (not shown) through the network 300.

Note that FIG. 1 illustrates one client 10 and one server 20 for the sake of simplicity. In fact, a plurality of clients and a plurality of servers can exist in the white list control system.

Client

In the client 10, an arithmetic device 10C is a microprocessor (CPU). The arithmetic device 10C starts an OS (Operating System) stored in a storage device 10B in accordance with a boot program such as a BIOS (Basic Input/Output System) stored in a ROM (Read Only Memory) of a memory 10E, and also starts various kinds of resident programs (for example, a control program 113 and the like) in accordance with the OS. At this time, the arithmetic device 10C uses the RAM (Random Access Memory) of the memory 10E as a work area. The OS is, for example, Windows®, Mac OS®, Linux®, iOS™, or Android™.

The storage device 10B is a hard disk drive (HDD) or solid-state drive (SSD), and stores not only the OS but also data 101 and various kinds of programs 100 that operate on the client 10. The various kinds of programs 100 stored in the storage device 10B include an identification program 110, a registration program 111, a detection program 112, a control program 113, and a file search tool 114, and details will be described later.

Note that the program 100 can include a plurality of programs of various functions such as the identification program 110 or only a single program having various functions. The various kinds of data 101 stored in the storage device 10B include the white list 120, a chained elevation criterion rule 130, and a black list 140, and details will be described later.

An I/O device 10A is an input/output interface (I/F) used to connect a pointing device (for example, mouse) and a keyboard, or a display incorporating a touch panel. Note that the keyboard may be a software keyboard. The I/O device 10A may be a speech input unit including a microphone or the like, which recognizes an input speech of an operator by a speech recognition function and transmits the recognized speech to the arithmetic device 10C. The I/O device 10A also functions as a user interface (UI) for displaying information.

A network I/F 10D is an interface to the network 300 and serves as a communication circuit to communicate with another computer. The arithmetic device 10C receives information, for example, partial data of the white list 120 from the server 20 and also transmits various kinds of information to the server 20 through the network I/F 10D.

Server

In the server 20, an arithmetic device 20C is a microprocessor (CPU). The arithmetic device 20C starts an OS stored in a storage device 20B in accordance with a boot program such as a BIOS stored in a ROM of a memory 20E. The arithmetic device 20C also loads a management console 210 from the storage device 20B to the RAM of the memory 20E. The arithmetic device 20C acquires information (for example, information of the white list 120) from a plurality of clients 10 and forms a database, or reversely transmits information to the client 10 and updates the white list 120.

The storage device 20B is an HDD or SSD, and stores not only the OS but also data 201 and various kinds of programs 200 that include the management console 210 and operate on the server 20. The various kinds of data 201 stored in the storage device 10B include a white list master 220, a chained elevation criterion rule 230, a black list master 240, and a white list candidate 250, and details will be described later.

An I/O device 20A is an interface (I/F) used to connect a pointing device (for example, mouse), a keyboard, and a monitor, and the monitor functions as a UI to display information. A network I/F 20D is an interface to the network 300 and serves as a communication circuit to communicate with another computer such as the client 10.

The arithmetic device 20C receives information about the white list 120 or the black list 140 from a plurality of clients 10 through the network I/F 20D, and manages the white list master 220 or the black list master 240 based on the received information.

Figure 2:
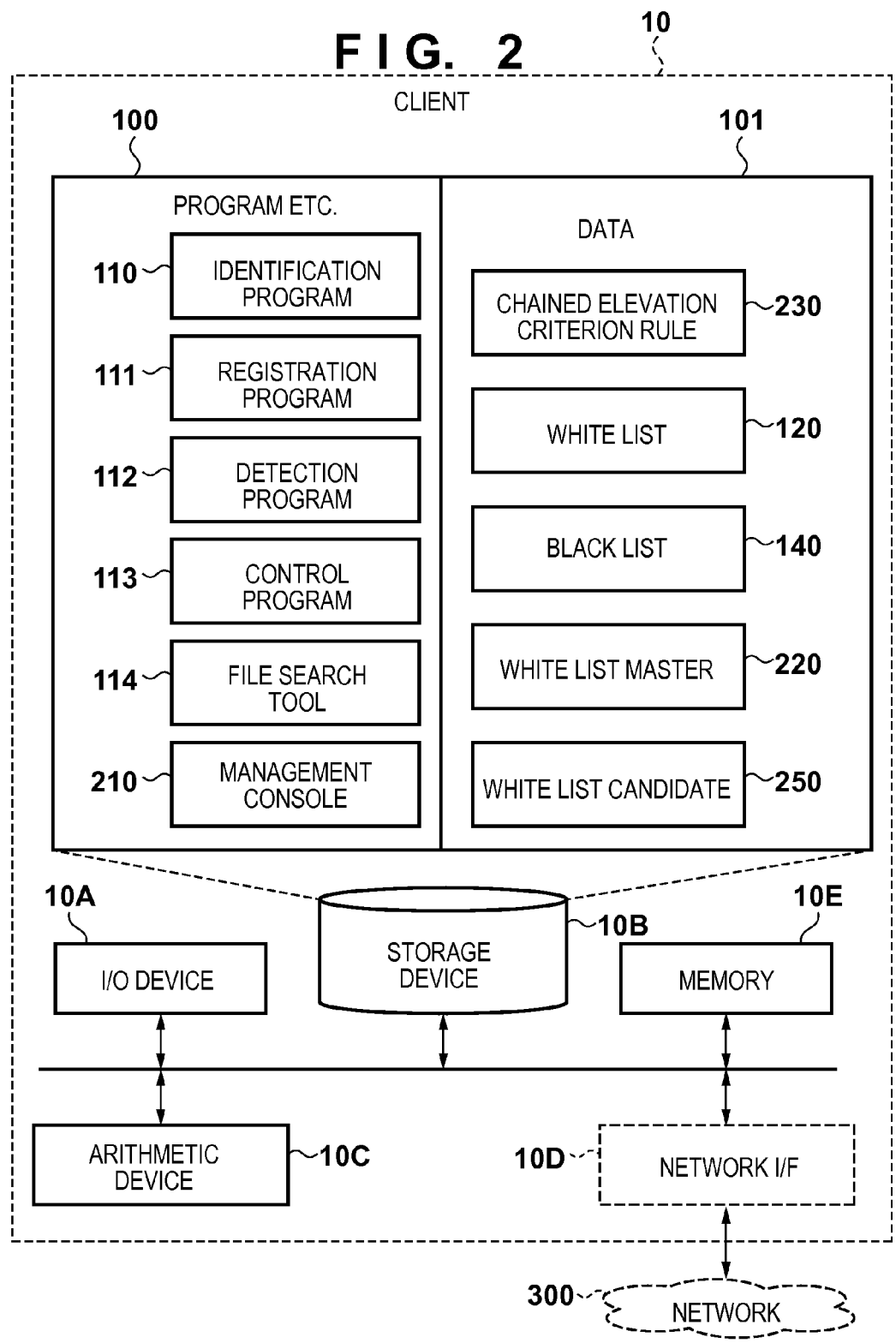
FIG. 2 is a block diagram showing the arrangement of the white list control system according to the first embodiment in which no server exists.

In the white list control system, the server 20 is not an indispensable component. FIG. 2 is a block diagram showing the arrangement of the white list control system in which no server 20 exists. In the arrangement shown in FIG. 2, since communication between the client 10 and the server 20 is unnecessary, the network 300 and the network I/F 10D are options.

The white list control system may use a thin client (for example, terminal service). The thin client is a system that allows the client to be remote-connected to the server and execute an application program on the server using a virtual desktop environment generated on the server.

[Programs and Data]

The identification program 110 is executed by the arithmetic device 10C and acquires information (to be referred to as program information hereinafter) such as a file name (program name), hash value, version information, file size, file path, and digital signature from a separately started program. The identification program 110 has an identification function of identifying the program based on the acquired program information. The identification program 110 collates the acquired program information with the chained elevation criterion rule 130 to be described later, and determines whether the program meets the chained elevation criterion.

The white list 120 is a list of information about programs that can be executed. As the information that constitutes the white list 120, program information acquired by the identification program 110 is used.

FIG. 3 shows an example of the white list 120. The white list 120 holds five types of information, that is, a program name, hash value, version information, file size, and chained elevation privilege flag (to be described later) for each program. Note that FIG. 3 shows merely an example, and the types and number of information held as the white list 120 are not limited to those in FIG. 3.

The white list master 220 is a list of a plurality of white lists 120. FIG. 4 shows an example of the white list master 220 existing in the server 20. The white list master 220 holds information associated with the white lists 120 of a plurality of clients in association with the names or codes of the clients. In the example of FIG. 4, the process names, hash values, registration dates/times, and latest startup dates/times of a plurality of programs are held as white list 003 corresponding to client PC 003. Note that FIG. 4 shows merely an example, and the types and number of information held as the white list master 220 are not limited to those in FIG. 4.

The detection program 112 is executed by the arithmetic device 10C, and has a monitoring function of monitoring startup of a program and generation of another program by the started program and a detection function of detecting these.

The registration program 111 is executed by the arithmetic device 10C, and has a registration function of registering, in a white list 120, a program whose startup or generation is detected by the detection program 112, based on the program information of the program acquired by the identification program 110.

The control program 113 is executed by the arithmetic device 10C, and has an startup permission/prohibition control functions for permitting or prohibiting (preventing) startup of a program that is about to be started on the client 10.

The chained elevation criterion rule 130 is a rule to determine whether a program or file was issued by a reliable issuer. The chained elevation criterion rule 130 includes rules defined by the administrator or user based on program information. The rules include, for example, a digital signature added to a program or file, verifying whether a digital certificate is authentic, determining whether the signatory name of a file is a name stored in advance, and determining whether a file name meets a designated condition.

The types and number of rules applied as the chained elevation criterion rule 130 are not limited to the above-described detailed examples. A combination of a plurality of rules, for example, "the digital signature or digital certificate is authentic, and the file name includes a character string "Setup" or "Update"" may be applied. In this case, when "malware that generates malware by exploiting vulnerability of an image viewer (Viewer.exe)" starts, the file name does not include the above-described character strings even if the digital signature of the image viewer is authentic. As a result, an effect of preventing an attack exploiting the vulnerability of the image viewer can be obtained.

The black list 140 is a list of programs prohibited from startup/execution. The data structure of the black list 140 is almost the same as the white list 120 shown in FIG. 3. The black list 140 is not required and may be absent on the client 10. If the black list 140 is not used, the black list master 240 in the server 20 is not required, either.

[White List Control Processing]

Outline of Processing

The detection program 112 detects startup of a program in the client 10 using a global hook (API (Application Programming Interface) hook or filter driver) or the like, and upon detecting startup of a program, calls the identification program 110. The identification program 110 acquires the program information of the program to be started and verifies whether the program meets the chained elevation criterion rule 130.

Upon determining via verification that the program meets the chained elevation criterion rule 130, the control program 113 permits startup of the program and calls the registration program 111. The registration program 111 receives the program information of the program from the identification program 110 and registers the program in the white list 120.

Note that if the program to be started meets the chained elevation criterion rule 130 but is registered in the black list 140, the control program 113 does not cause the registration program 111 to execute registration of the program. That is, prohibition of startup/execution of the program is maintained.

Next, the registration program 111 gives "chained elevation privilege" to the program registered in the white list 120. The presence/absence of chained elevation privilege is set to, for example, the chained elevation privilege flag in the white list 120. Alternatively, a table corresponding to the white list 120 may be stored in the storage device 10B, and the presence/absence of chained elevation privilege may be registered in each record of the table. The chained elevation privilege is defined as follows.

When a program (parent program) having chained elevation privilege generates some program (child program), the child program is unconditionally registered in the white list 120. When the parent program starts the child program, the child program is also given chained elevation privilege. When the arrangement shown in FIG. 1 performs registration processing concerning chained elevation privilege, the following processing is performed.

The detection program 112 monitors the behavior of the parent program using a global hook or the like. Upon detecting generation of a child program by the parent program, the detection program 112 causes the identification program 110 to acquire the program information of the child program. The identification program 110 transfers the acquired program information to the registration program 111. The registration program 111 creates data of a record to be added to the white list 120 based on the received program information, and adds the created data to the white list 120.

At this time, the following method is also available. That is, upon detecting generation of a child program, the detection program 112 analyzes the generated file and determines whether it is necessary to register information about the generated file in the white list. Upon determining that the information need not be registered, the processing ends without program information acquisition by the identification program 110. The registration is determined to be unnecessary in a case where, for example, the binary header of the generated file is analyzed, and the file can be determined not to be an execution file because the configuration is not a PE (Portable Executable) format.

Next, the detection program 112 monitors startup of the child program by the parent program. Upon detecting startup of the child program by the parent program, the detection program 112 calls the registration program 111. The called registration program 111 sets "present" to the chained elevation privilege flag of the child program. The control program 113 permits startup of the child program.

Using the chained elevation privilege, a program generated by a program having a behavior of generating a child program, for example, a security patch of software can automatically be added to the white list 120. In other words, an operation concerning white list update, that is, an operation concerning registering a generated child program in the white list 120 can be reduced.

Note that the processing concerning chained elevation privilege can be performed not only when the parent program generates a child program but also when the parent program is changed (for example, renamed) or the child program is changed.

"Determining whether a program has an authentic digital signature" is applied to the chained elevation criterion rule 130. This makes it possible to determine, without making the operator's awareness intervene, that the program was issued by a reliable issuer and is not a malicious program such as malware. Note that whether an authentic digital signature is present can be determined by, for example, a method using a Windows® API (Application Programming Interface).

Upon determining that the program does not meet the chained elevation criterion rule 130, the control program 113 performs general white list control. That is, upon determining that the program does not meet the chained elevation criterion rule 130, the identification program 110 determines whether the program is registered in the white list 120. Upon determining that the program is registered in the white list 120, the control program 113 determines whether the program has chained elevation privilege, and permits startup of the program. Upon determining that the program is not registered in the white list 120, the control program 113 prevents startup of the program using a global hook or the like.

In addition, the identification program 110 determines whether the program to be started is registered in the black list 140. If the program is registered in the black list 140, startup of the program is prevented. If the program is not registered in the black list 140, startup of the program is permitted. Such a method is also employable.

Note that in the following explanation, a state in which a program or the like is registered in the white list 120 or black list 140 will sometimes be expressed as "exists in the list", and a state in which a program or the like is not registered as "does not exist in the list".

Details of Processing

White list control processing will be described with reference to the flowcharts of FIGS. 5A and 5B.

The detection program 112 monitors startup of a program (step S201), and upon detecting startup of the program, advances the process to step S202.

Upon detecting startup of the program, the identification program 110 acquires the program information of the program (step S202) and determines whether the program exists in the black list 140 (step S203). Upon determining that the program exists in the black list 140, the control program 113 prevents startup of the program (step S204) and returns the process to step S201.

If the program does not exist in the black list 140, the identification program 110 determines whether the program meets the chained elevation criterion rule 130 (step S205). If the program does not meet the chained elevation criterion rule 130, the identification program 110 determines whether the program exists in the white list 120 (step S206).

Upon determining that the program exists in the white list 120, the identification program 110 determines whether the program has chained elevation privilege (step S206B). Upon determining that the program has chained elevation privilege, the control program 113 permits startup of the program (step S210).

Upon determining that the program does not have chained elevation privilege, the control program 113 permits startup of the program (step S207), and returns the process to step S201. Upon determining that the program does not exist in the white list 120, the control program 113 prevents startup of the program (step S204), and returns the process to step S201.

Upon determining that the program meets the chained elevation criterion rule 130, the control program 113 transfers the program information of the program to the registration program 111. The registration program 111 thus registers the program (parent program) in the white list 120 (step S208), and sets "present" to the chained elevation privilege flag (step S209). Next, the control program 113 permits startup of the parent program (step S210).

The detection program 112 monitors generation of a child program by the parent program given chained elevation privilege (step S211). If the parent program generates a child program, the detection program 112 advances the process to step S212. If the parent program does not generate a child program, the process returns to step S201.

Note that in step S211, the detection program 112 may monitor not only generation of a child program but also a change (for example, rename) of a child program or parent program. Upon detecting a change of the parent program, the same processing as that for the child program is performed for the program (parent program).

Upon detecting generation of a child program, the identification program 110 acquires the program information of the child program (step S212), and transfers the acquired program information to the registration program 111. The registration program 111 thus registers the child program in the white list 120 (step S213).

The detection program 112 monitors whether the parent program given chained elevation privilege starts the child program (step S214). If the parent program starts the child program, the detection program 112 advances the process to step S215. If the parent program does not start the child program, the detection program 112 returns the process to step S201.

Upon detecting startup of the child program by the parent program, the identification program 110 determines whether the child program exists in the black list 140 (step S215). Upon determining that the child program exists in the black list 140, the control program 113 prevents startup of the child program (step S216). The registration program 111 deletes registration of the child program from the white list 120 (step S217), and returns the process to step S201.

Upon determining that the child program does not exist in the black list 140, the process returns to step S209. Hence, "present" is set to the chained elevation privilege flag of the child program (step S209), startup of the child program is permitted (step S210), and generation of a grandchild program by the child program given chained elevation privilege is monitored (step S211). If the child program generates a grandchild program, the grandchild program is registered in the white list 120. If the child program given chained elevation privilege starts the grandchild program, chained elevation privilege is given to the grandchild program. These processes (steps S209 to S215) are recursively repeated.

Note that if the black list 140 is absent, the identification program 110 passes the determination of step S215. In this case, "present" is set to the chained elevation privilege flag of the child program started by the parent program or the grandchild program started by the child program (step S209), and startup of the child program is permitted (step S210).

Note that when registering the parent program/descendant program in the white list 120, it may be determined whether the program is registered in the white list 120, and upon determining that the program is not registered, the program may be registered in the white list 120. If the program is already registered in the white list 120, the process advances to the next process without performing registration. Repetitive registration action can be prevented by determining whether a program is already registered in the white list 120.

Programs from the second generation such as a child program and a grandchild program generated based on the parent program of the first generation will be referred to as "descendant programs" hereinafter.

Coping with Installers

In step S201, the detection program 112 determines, by comparison with the list, whether the program to be started is an installer program (for example, msiexec.exe in Windows®) stored in the storage device 10B in advance. Upon determining that an installer program (to be referred to as an "installer" hereinafter) is to be started, processing from step S202 is switched because the operation of the installer is different from the operation of other programs.

When the operator instructs execution of an installer package file (for example, msi file, msp file, or msu file), the installer is started and decompresses files stored in the installer package file (to be referred to as a "package" hereinafter). Hence, determination based on the chained elevation criterion rule 130 needs to be performed for not the installer but the package, and the processes shown in FIGS. 5A and 5B cannot directly be applied.

White list control processing when an installer is started will be described with reference to the flowchart of FIG. 6.

The identification program 110 acquires the file information of the package (step S221) and determines whether the package exists in the black list 140 (step S222). Upon determining that the package exists in the black list 140, the control program 113 prevents startup of the installer (step S223) and returns the process to step S201. Note that if the black list 140 is absent, the identification program 110 passes the determination of step S222.

If the package does not exist in the black list 140, the identification program 110 determines whether the package meets the chained elevation criterion rule 130 (step S224). If the package does not meet the chained elevation criterion rule 130, the identification program 110 determines whether the package exists in the white list 120 (step S225). Upon determining that the package exists in the white list 120, the control program 113 sets the chained elevation privilege flag of the installer to "present" (step S209) and permits startup of the installer (step S210). Upon determining that the package does not exist in the white list 120, the control program 113 prevents startup of the installer (step S223), and returns the process to step S201.

Figure 5A:
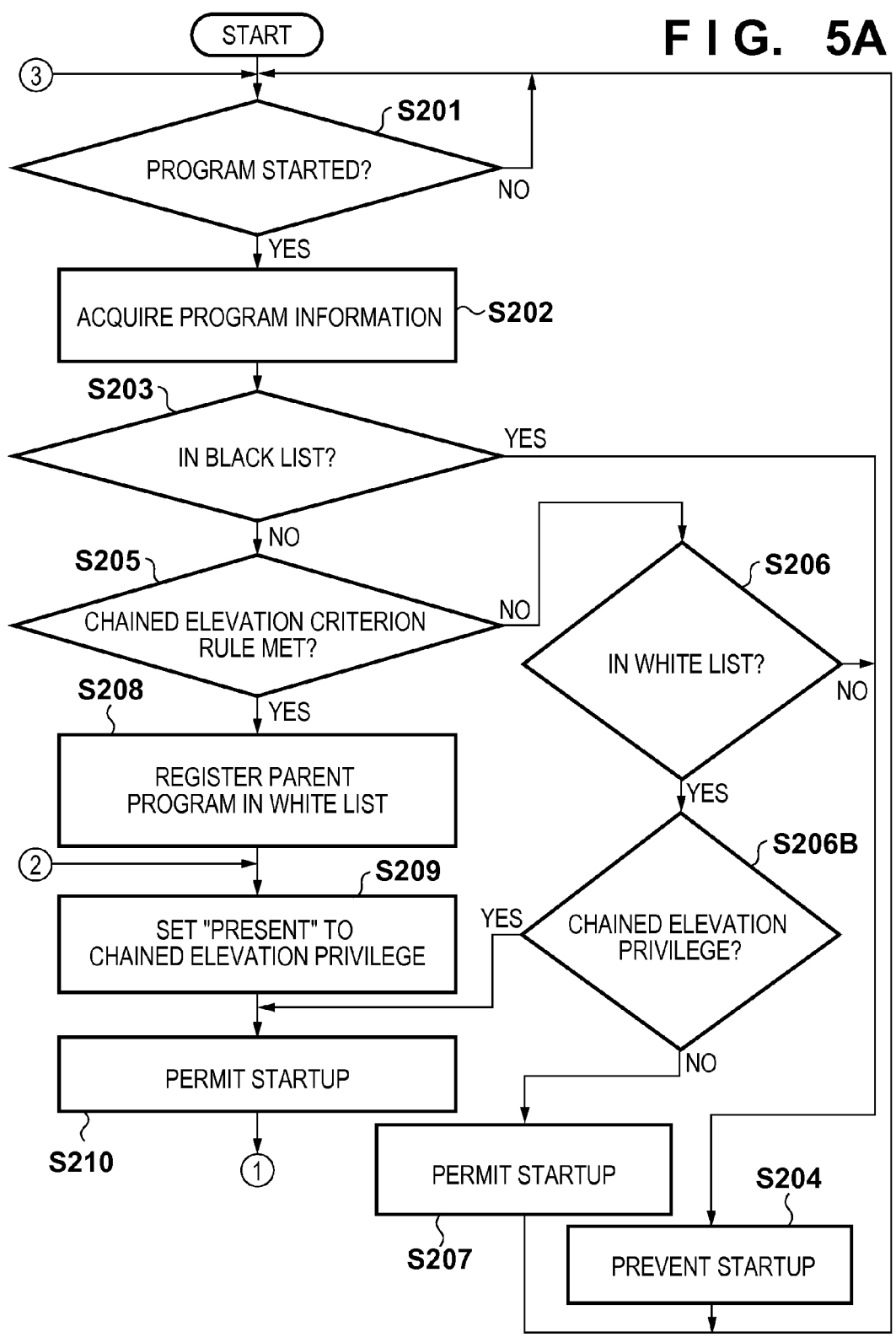
FIGS. 5A and 5B are flowcharts for explaining white list control processing.
Figure 5B:
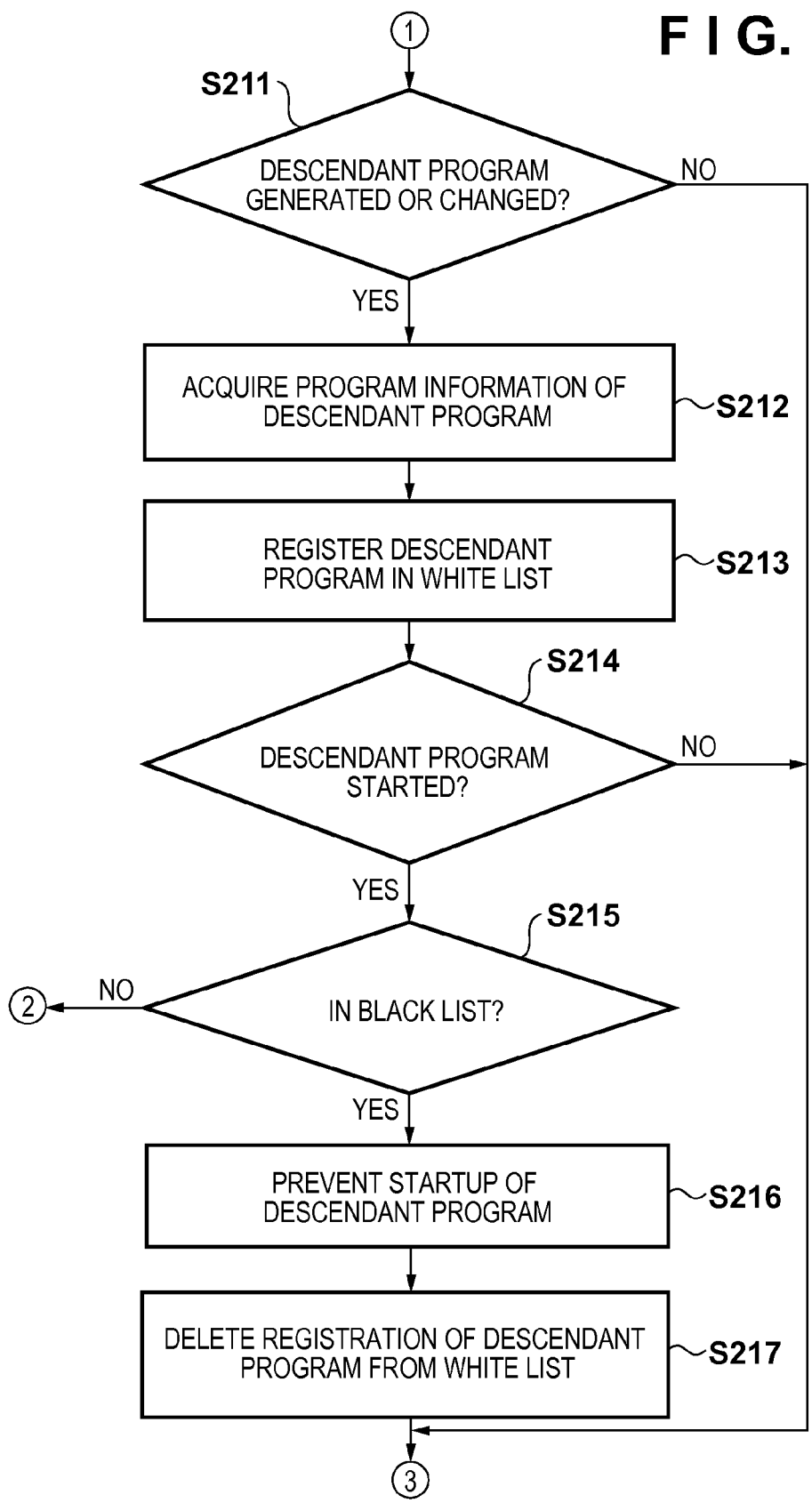

On the other hand, processes performed when the package meets the chained elevation criterion rule 130 are the same as in steps S209 to S217 of FIGS. 5A and 5B. "Present" is set to the chained elevation privilege flag of the installer (step S209), and startup of the installer is permitted (step S210). A program extracted from the package by the installer is handled like a child program generated by a parent program (in this case, installer). That is, the program extracted from the package is registered in the white list 120 as a descendant program. When the descendant program starts a program of the next generation, chained elevation privilege is given to the program to be started. These processes (steps S209 to S215) are recursively repeated.

Figure 6:
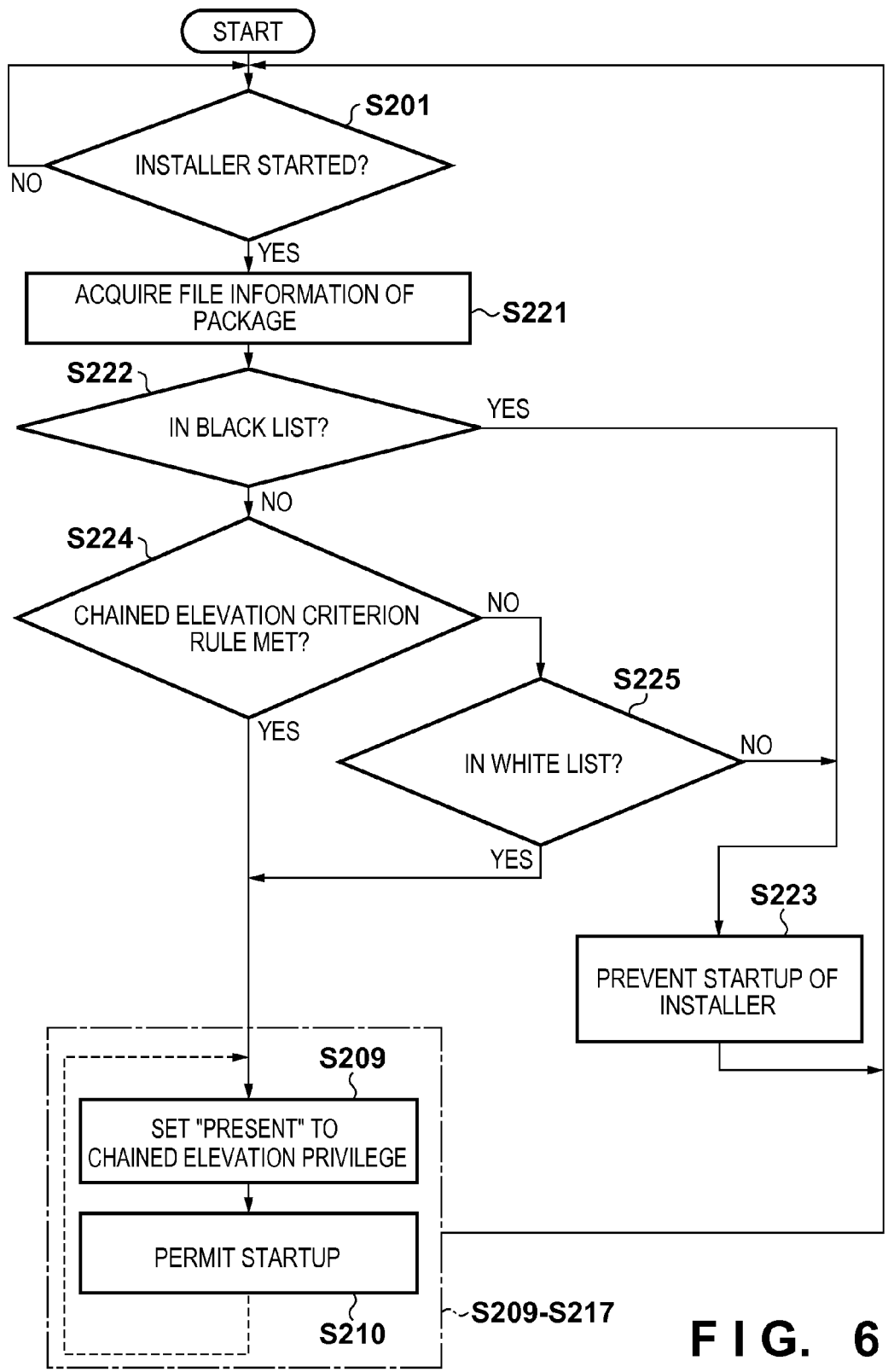
FIG. 6 is a flowchart for explaining white list control processing when an installer is started.

Note that a child program is not generated by a parent program, but instead an installer package by the program (parent program) is generated in step S211, the processing shown in FIG. 6 is applicable to the package file.

[Cases where Chained Elevation Privilege is Inherited by/Given to Program Other than Child Program Generated by Parent Program]

If a child program generated from a parent program having chained elevation privilege is started by the parent program, the child program inherits the chained elevation privilege. In the following cases as well, chained elevation privilege may also be inherited or given.

Pattern 1

Assume a case where a plurality of descendant programs are generated from a single parent program in FIGS. 5A and 5B. At this time, if one of the descendant programs inherits the chained elevation privilege from the parent program, and the descendant program that has inherited the chained elevation privilege starts another descendant program, the started descendant program can inherit the chained elevation privilege.

For example, the update operation of Windows® includes the above-described operation. When the method of pattern 1 is executed, update of Windows® can be performed without being blocked.

When pattern 1 is executed, it is determined in step S214 of FIG. 5B "whether the descendant program is started by the parent program or a program generated from the same parent program and having inherited chained elevation privilege from the parent program".

Pattern 2

Assume a case where an installer is started from another program in FIG. 6. At this time, if a program having chained elevation privilege starts the installer, the installer can inherit the chained elevation privilege.

Some pieces of commercially available software start an installer at the time of installation. When the method of pattern 2 is executed, such software can be installed without being blocked.

Pattern 3

Assume a case where a child program generated from a program having chained elevation privilege is started by a program that does not have chained elevation privilege in FIGS. 5A and 5B. At this time, two program groups, that is, a "generated program group" and a "startup program group" are defined in advance. Processing of giving chained elevation privilege can be performed for a program generated from a program belonging to the generated program group and started by a program belonging to the startup program group.

Some pieces of commercially available software perform the above-described operation at the time of installation.

When the method of pattern 3 is executed, such software can be installed without being blocked.

[Creation of White List]

To operate the white list control system, the white list 120 suitable for the operation environment needs to be created.

Processing Triggered by Program Startup

In FIGS. 5A, 5B, and 6, if a program or package neither meets the chained elevation criterion rule 130 nor exists in the white list 120 (NO in step S206 or S225), the control program 113 prevents startup of the program (step S204 or S223), as described above. However, if such a program or package (to be referred to as "unregistered program" hereinafter) is found, it is possible to attempt to update the white list 120.

Update processing of the white list 120 triggered by program startup will be described with reference to the flowchart of FIG. 7.

If an unregistered program is found (step S301), the registration program 111 transmits, to the server 20, the program information (to be referred to as "unregistered information" hereinafter) of the unregistered program transferred from the identification program 110 (step S302). The process then returns to step S301.

Note that the unregistered information may be transmitted to the server 20 not immediately after finding of the unregistered program but on a predetermined cycle. For example, the registration program 111 temporarily stores unregistered information in a predetermined area of, for example, the storage device 10B or the memory 10E. It is determined on a predetermined cycle (for example, every five min or every hour) whether stored unregistered information exists. If unregistered information is stored, the information is transmitted to the server 20.

Upon receiving the unregistered information from the client 10 (step S311), the management console 210 of the server 20 determines whether information that matches the received unregistered information exists in the white list candidate 250 (step S312). If information that matches the received unregistered information exists in the white list candidate 250, the process returns to step S311.

If information that matches the received unregistered information does not exist in the white list candidate 250, the management console 210 adds the received unregistered information to the white list candidate 250 (step S313). The unregistered information added to the white list candidate 250 is presented to the operator of the server 20 by, for example, email or an alert window (step S314).

The operator determines, by referring to the presented information, whether to register the unregistered program in the white list, and inputs an instruction according to the determination result to the management console 210. The management console 210 determines whether the instruction of the operator indicates registration of the program (step S315). If the instruction of the operator indicates registration, the program is registered in the white list master 220 (step S316), and "registered" is recorded in the record of the program in the white list candidate 250 (step S317). If the instruction of the operator indicates non-registration, "non-registration" is recorded in the record of the program in the white list candidate 250 without registering the program in the white list master 220 (step S318). Then, the process returns to step S311.

The management console 210 transmits the data of the white list master 220 to the client 10 periodically (for example, every other hour or every other day). The white list 120 of the client 10 is thus updated.

Processing Triggered by Program Search

Processing of adding a program to the white list candidate 250 which is triggered by program startup has been described above. However, it is also possible to search for a program using, for example, a file search tool of OS standard and register the found program in the white list candidate 250. With this processing, all programs stored in the storage device 10B of the client 10 can be added to the white list candidate 250.

Figure 8:
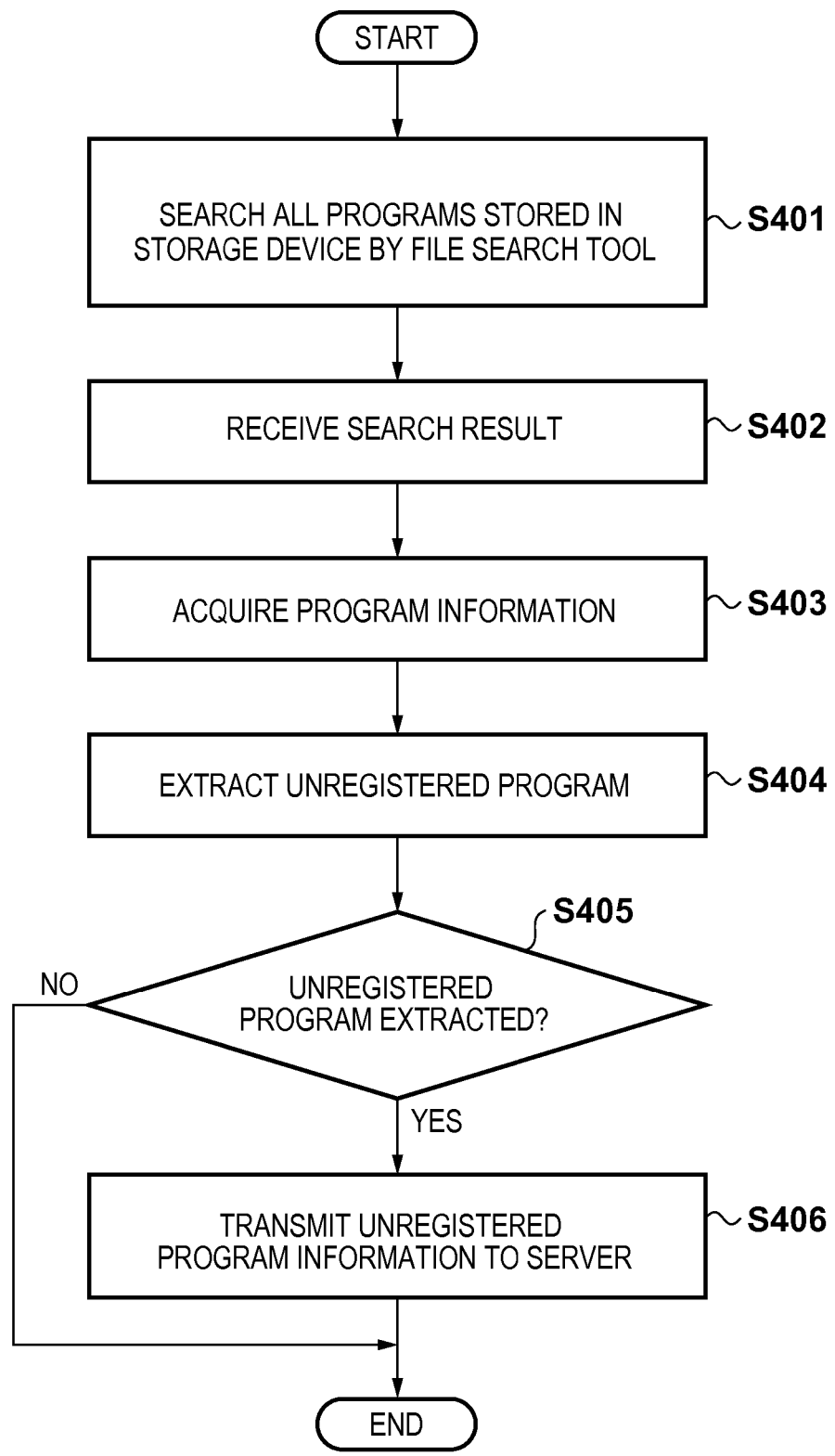
FIG. 8 is a flowchart for explaining white list update processing triggered by a program search.

White list update processing triggered by a program search will be described with reference to the flowchart of FIG. 8.

The file search tool 114 is started by an instruction of the operator of the client 10 (or server 20), and a file search is executed based on an instructed search condition (step S401). When adding a program to the white list candidate 250, all programs stored in the storage device 10B are searched, and the identification program 110 receives the search result (step S402).

Upon receiving the search result, the identification program 110 acquires the program information of the found programs (step S403). An unregistered program that neither meets the chained elevation criterion rule 130 nor exists in the white list 120 is extracted from the found programs (step S404). When an unregistered program is extracted (step S405), the registration program 111 transmits the program information of the unregistered program to the server 20 (step S406).

Processing of the management console 210 is the same as the processing (steps S311 to S318 of FIG. 7) triggered by program startup, and a detailed description thereof will be omitted.

An example has been described above in which a program that is not registered in the white list 120 is registered in the white list 120. The same processing as described above is performed when a package that is not registered in the white list 120 is registered in the white list 120.

Figure 7:
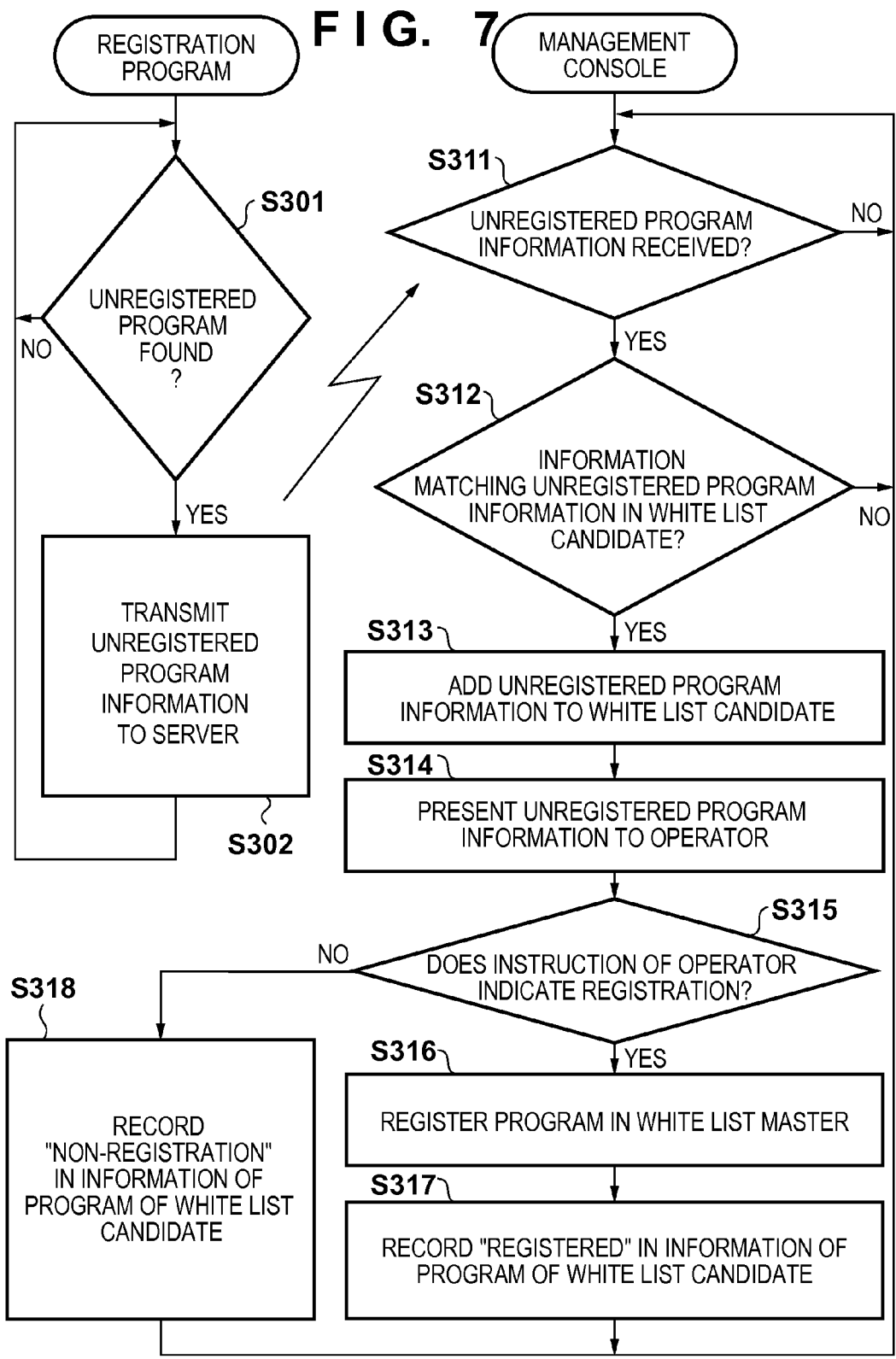
FIG. 7 is a flowchart for explaining white list update processing triggered by program startup.

In the arrangement shown in FIG. 2 without the server 20, the processing (steps S311 to S318) of the management console 210 shown in FIG. 7 is also executed on the client 10, as a matter of course.

As described above, it is possible to reduce update operations of the white list when using the white list type control method. This reduces the burden on the system administrator or the like in extracting an execution file and updating the white list. In addition, the determination using the chained elevation criterion rule 130 reduces an operation of determining whether an updater is reliable.

Automatic Registration of Installer

An example has been described above in which a program already registered in the white list master 220 (white list 120) meets the chained elevation criterion rule 230. However, in a system that adds setting information and the like to a program to dynamically create an installer (by, for example, combining another file to an execution file), it may be difficult to meet the above conditions (for example, determination by a digital signature). Such a dynamically created installer (or updater) needs to be automatically registered in the white list master 220.

Figure 18:
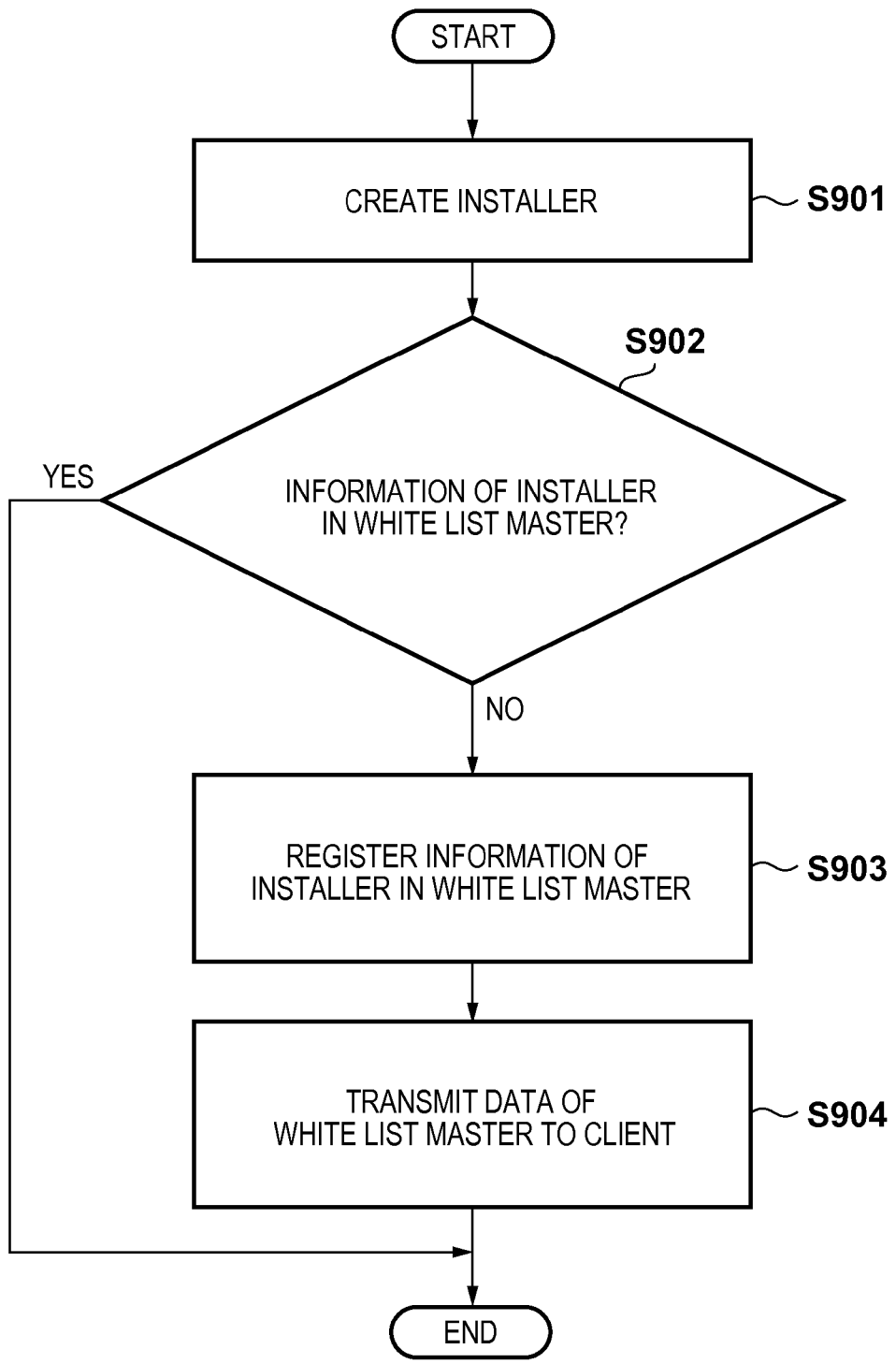
FIG. 18 is a flowchart for explaining processing of creating the installer of a control program from a management console.

Processing of creating the installer of the control program 113 from the management console 210 will be described with reference to the flowchart of FIG. 18. Note that the same processing is performed to create an updater.

In accordance with an instruction of an operator of the server 20, the management console 210 is started, and the installer of the control program 113 is created (step S901). The management console 210 creates the installer and determines whether the information of the installer exists in the white list master 220 (step S902). If the information of the installer already exists, the installer creation processing ends.

If the information of the installer does not exist in the white list master 220, the management console 210 registers the information of the installer in the white list master 220 (step S903). The management console 210 transmits the data of the white list master 220 to the client 10 periodically (for example, every other hour or every other day) (step S904). The white list 120 of the client 10 is thus updated, and startup of the installer in the client 10 is permitted.

From step S902, a specific startup option may be given to startup of the management console 210, thereby registering a designated program (file) in the white list master 220. An example of the specific startup option is "-register c:\sample\sample.exe".

An example has been described above in which a program (installer or updater) that is not registered in the white list master 220 is registered in the white list master 220. The same processing as described above is performed when a package that is not registered in the white list master 220 is registered in the white list master 220. In the arrangement shown in FIG. 2 without the server 20, the processing of the management console 210 is also executed on the client 10, as a matter of course.

Process startup has been described above as an example of white list control. The white list control can also be performed for a predetermined operation such as network access. In this case, the white list 120 includes a connection destination IP address, a connection destination port number, and the like.

With the above processing, a program generated in accordance with a specific procedure or a program generated from a specific program can automatically be registered in the white list master 220/white list 120 in spite of the chained elevation criterion rule 230.

Second Embodiment

A white list control system according to the second embodiment of the present invention will be described below. Note that the same reference numerals as in the first embodiment denote the same parts in the second embodiment, and a detailed description thereof will be omitted.

[System Arrangement]

A white list control system according to the second embodiment has the same arrangement as in FIG. 1 or 2, and a detailed description thereof will be omitted. Only parts different from the first embodiment will be explained.

An identification program 110 according to the second embodiment acquires program information, as in the first embodiment. However, the program information acquired by the identification program 110 according to the second embodiment includes the name of a PC that stores the program. The identification program 110 according to the second embodiment has an identification function of identifying the program based on the acquired program information, and a function of collating the acquired program information with a chained elevation criterion rule 130 and determining whether the program meets the chained elevation criterion, as in the first embodiment.

A white list 120 according to the second embodiment is a list of information about programs permitted to do network access. As the information that constitutes the white list 120, program information acquired by the identification program 110 is used.

FIG. 9 shows an example of the white list 120 according to the second embodiment. The white list 120 holds seven types of information, that is, a program name (execution file name), hash value, version information, file size, connection destination IP address, connection destination port number, and chained elevation privilege flag to be described later for each program. Note that FIG. 9 shows merely an example, and the types and number of information held as the white list 120 are not limited to those in FIG. 9.

FIG. 10 shows an example of a white list master 220 according to the second embodiment which exists in a server 20. The white list master 220 holds information associated with the white lists 120 of a plurality of clients in association with the names or codes of the clients. In the example of FIG. 10, the process names, hash values, connection destination IP addresses, connection destination port numbers, registration dates/times, and latest startup dates/times of a plurality of programs are held as white list 003 corresponding to PC 003. Note that FIG. 10 shows merely an example, and the types and number of information held as the white list master 220 are not limited to those in FIG. 10.

A detection program 112 and a registration program 111 according to the second embodiment have the same functions as in the first embodiment.

A control program 113 according to the second embodiment has a control function of permitting or prohibiting, based on the white list 120, network access of a program started on a client 10. The control program 113 according to the second embodiment also has a control function of controlling network access using the IP address or port number of a connection destination to be accessed by a program as a determination criterion.

The chained elevation criterion rule 130 is the same as in the first embodiment.

A black list 140 according to the second embodiment is a list of programs prohibited from network access. The data structure of the black list 140 is almost the same as the white list 120 shown in FIG. 9. As in the first embodiment, the black list 140 is not required and may be absent on the client 10. If the black list 140 is not used, a black list master 240 in the server 20 is not required, either.

[White List Control Processing]

Outline of Processing

As in the first embodiment, the detection program 112 detects startup of a program in the client 10 using a global hook or the like, and upon detecting startup of a program, calls the identification program 110. The identification program 110 acquires the program information of the program to be started and verifies whether the program meets the chained elevation criterion rule 130.

Upon determining by the verification that the program meets the chained elevation criterion rule 130, the control program 113 determines that the program is an updater and calls the registration program 111. The registration program 111 receives the program information of the program from the identification program 110 and registers the program in the white list 120. This registration enables network access of the program.

Note that if the program to be started meets the chained elevation criterion rule 130 but is registered in the black list 140, the control program 113 does not cause the registration program 111 to execute registration of the program. That is, prohibition of network access of the program is maintained. Note that if prohibition of network access is maintained, execution of the program to be started may be prevented or permitted.

At this point of time, it is impossible to know the IP address or port number of the connection destination to be accessed by the program. For this reason, the registration program 111 registers, in the white list 120, a record (for example, third row in FIG. 9) that is set not to restrict the IP address or port number of the connection destination. Hence, the program determined to be an updater can normally operate without a restriction on network access.

Next, the registration program 111 gives "chained elevation privilege" to the program registered in the white list 120. This processing is the same as in the first embodiment.

When the detection program 112 detects startup of a child program by a parent program, and the registration program 111 sets "present" to the chained elevation privilege flag of the child program, the control program 113 permits network access of the child program.

Upon determining that the program does not meet the chained elevation criterion rule 130, the control program 113 performs general white list control. That is, upon determining that the program does not meet the chained elevation criterion rule 130, the identification program 110 determines whether the program is registered in the white list 120. Upon determining that the program is registered in the white list 120, the control program 113 determines whether the program has chained elevation privilege, and permits network access of the program. Upon determining that the program is not registered in the white list 120, network access of the program is prohibited by a global hook, packet filtering, or the like.

In addition, the identification program 110 determines whether the program to be started is registered in the black list 140. If the program is registered in the black list 140, network access of the program is prohibited. If the program is not registered in the black list 140, network access of the program is permitted. Such a method is also employable.

Details of Processing

White list control processing according to the second embodiment will be described with reference to the flowcharts of FIGS. 11A and 11B.

The detection program 112 monitors startup of a program (step S601), and upon detecting startup of the program, advances the process to step S602.

Upon detecting startup of the program, the identification program 110 acquires the program information of the program (step S602) and determines whether the program exists in the black list 140 (step S603). Upon determining that the program exists in the black list 140, the control program 113 prohibits network access of the program (step S604) and returns the process to step S601. Note that if the black list 140 is absent, the identification program 110 passes the determination of step S603.

If the program does not exist in the black list 140, the identification program 110 determines whether the program meets the chained elevation criterion rule 130 (step S605). If the program does not meet the chained elevation criterion rule 130, the identification program 110 determines whether the program exists in the white list 120 (step S606).

Upon determining that the program exists in the white list 120, the identification program 110 determines whether the program has chained elevation privilege (step S606B). Upon determining that the program has chained elevation privilege, the control program 113 permits network access of the program (step S610).

Upon determining that the program does not have chained elevation privilege, the control program 113 permits network access of the program (step S607), and returns the process to step S601. Upon determining that the program does not exist in the white list 120, the control program 113 prohibits network access of the program (step S604), and returns the process to step S601.

Upon determining that the program meets the chained elevation criterion rule 130, the control program 113 transfers the program information of the program to the registration program 111. The registration program 111 thus registers the program (parent program) in the white list 120 (step S608), and sets "present" to the chained elevation privilege flag (step S609). Next, the control program 113 permits network access of the parent program (step S610).

The detection program 112 monitors generation of a child program by the parent program given chained elevation privilege (step S611). If the parent program generates a child program, the detection program 112 advances the process to step S612. If the parent program does not generate a child program, the process returns to step S601.

Note that in step S611, the detection program 112 may monitor not only generation of a child program but also a change (for example, rename) of a child program or parent program. Upon detecting a change of the parent program, the same processing as that for the child program is performed for the program (parent program).

Upon detecting generation of a child program, the identification program 110 acquires the program information of the child program (step S612), and transfers the acquired program information to the registration program 111. The registration program 111 thus registers the child program in the white list 120 (step S613).

The detection program 112 monitors whether the parent program given chained elevation privilege starts the child program (step S614). If the parent program starts the child program, the detection program 112 advances the process to step S615. If the parent program does not start the child program, the detection program 112 returns the process to step S601.

Upon detecting startup of the child program by the parent program, the identification program 110 determines whether the child program exists in the black list 140 (step S615). Upon determining that the child program exists in the black list 140, the control program 113 prohibits network access of the child program (step S616). The registration program 111 deletes registration of the child program from the white list 120 (step S617), and returns the process to step S601.

Upon determining that the child program does not exist in the black list 140, the process returns to step S609. Hence, "present" is set to the chained elevation privilege flag of the child program (step S609), network access of the child program is permitted (step S610), and generation of a grandchild program by the child program given chained elevation privilege is monitored (step S611). If the child program generates a grandchild program, the grandchild program is registered in the white list 120. If the child program given chained elevation privilege starts the grandchild program, chained elevation privilege is given to the grandchild program. These processes (steps S609 to S615) are recursively repeated.

Note that if the black list 140 is absent, the identification program 110 passes the determination of step S615. In this case, "present" is set to the chained elevation privilege flag of the child program started by the parent program or the grandchild program started by the child program (step S609), and network access of the child program is permitted (step S610).

Note that when registering the parent program/descendant program in the white list 120, it may be determined whether the program is registered in the white list 120, and upon determining that the program is not registered, the program may be registered in the white list 120. If the program is already registered in the white list 120, the process advances to the next process without performing registration. Repetitive registration actions can be prevented by determining whether the program is already registered in the white list 120.

Coping with Installer

As in the first embodiment, in step S601, the detection program 112 determines, by comparison with the list, whether the program to be started is an installer stored in a storage device 10B in advance. Upon determining that an installer is to be started, processing from step S602 is switched because the operation of the installer is different from the operation of other programs. That is, determination based on the chained elevation criterion rule 130 needs to be performed for not the installer but the package, and the processes shown in FIGS. 11A and 11B cannot directly be applied.

White list control processing according to the second embodiment when an installer is started will be described with reference to the flowchart of FIG. 12.

The identification program 110 acquires the file information of the package (step S621) and determines whether the package exists in the black list 140 (step S622). Upon determining that the package exists in the black list 140, the control program 113 prohibits startup of the installer (step S623) and returns the process to step S601. Note that if the black list 140 is absent, the identification program 110 passes the determination of step S622.

If the package does not exist in the black list 140, the identification program 110 determines whether the package meets the chained elevation criterion rule 130 (step S624). If the package does not meet the chained elevation criterion rule 130, the control program 113 prohibits startup of the installer (step S623) and returns the process to step S601. That is, installation of a package registered in the black list 140 or a package that does not meet the chained elevation criterion rule 130 is stopped.

If the package does not exist in the black list 140, the identification program 110 determines whether the package meets the chained elevation criterion rule 130 (step S624). If the package does not meet the chained elevation criterion rule 130, the identification program 110 determines whether the package exists in the white list 120 (step S625). Upon determining that the package does not exist in the white list 120, the control program 113 prevents startup of the installer (step S623), and returns the process to step S601.

On the other hand, if the package meets the chained elevation criterion rule 130 or exists in the white list 120, the control program 113 permits startup of the installer (step S626). Subsequent processes are the same as in steps S609 to S617 of FIGS. 11A and 11B. "Present" is set to the chained elevation privilege flag of the installer (step S609), and network access of the installer is permitted (step S610). A program extracted from the package by the installer is handled like a child program generated by a parent program (in this case, installer). That is, the program extracted from the package is registered in the white list 120 as a descendant program. When the descendant program starts a program of the next generation, chained elevation privilege is given to the program to be started. These processes (steps S609 to S615) are recursively repeated.

Figure 12:
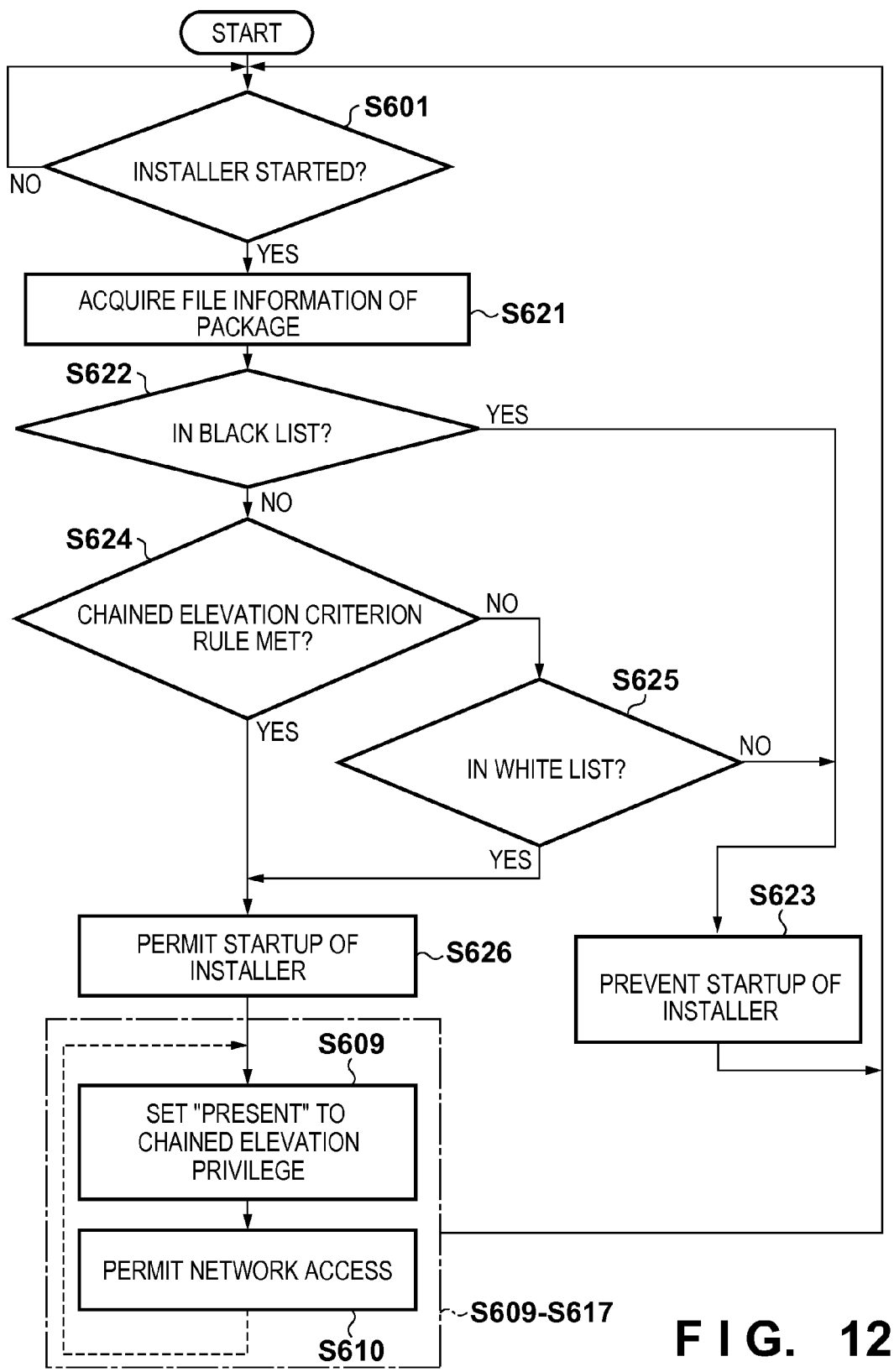
FIG. 12 is a flowchart for explaining white list control processing according to the second embodiment when an installer is started.

Note that if not generation of a child program by a parent program but generation of an installer package by the program (parent program) is done in step S611, the processing shown in FIG. 12 is applicable to the package file.

If a child program generated from a parent program having chained elevation privilege is started by the parent program, the chained elevation privilege is inherited. The chained elevation privilege may be inherited or given, as in patterns 1 to 3 described in the first embodiment.

[Network Access Control]

Figure 13:
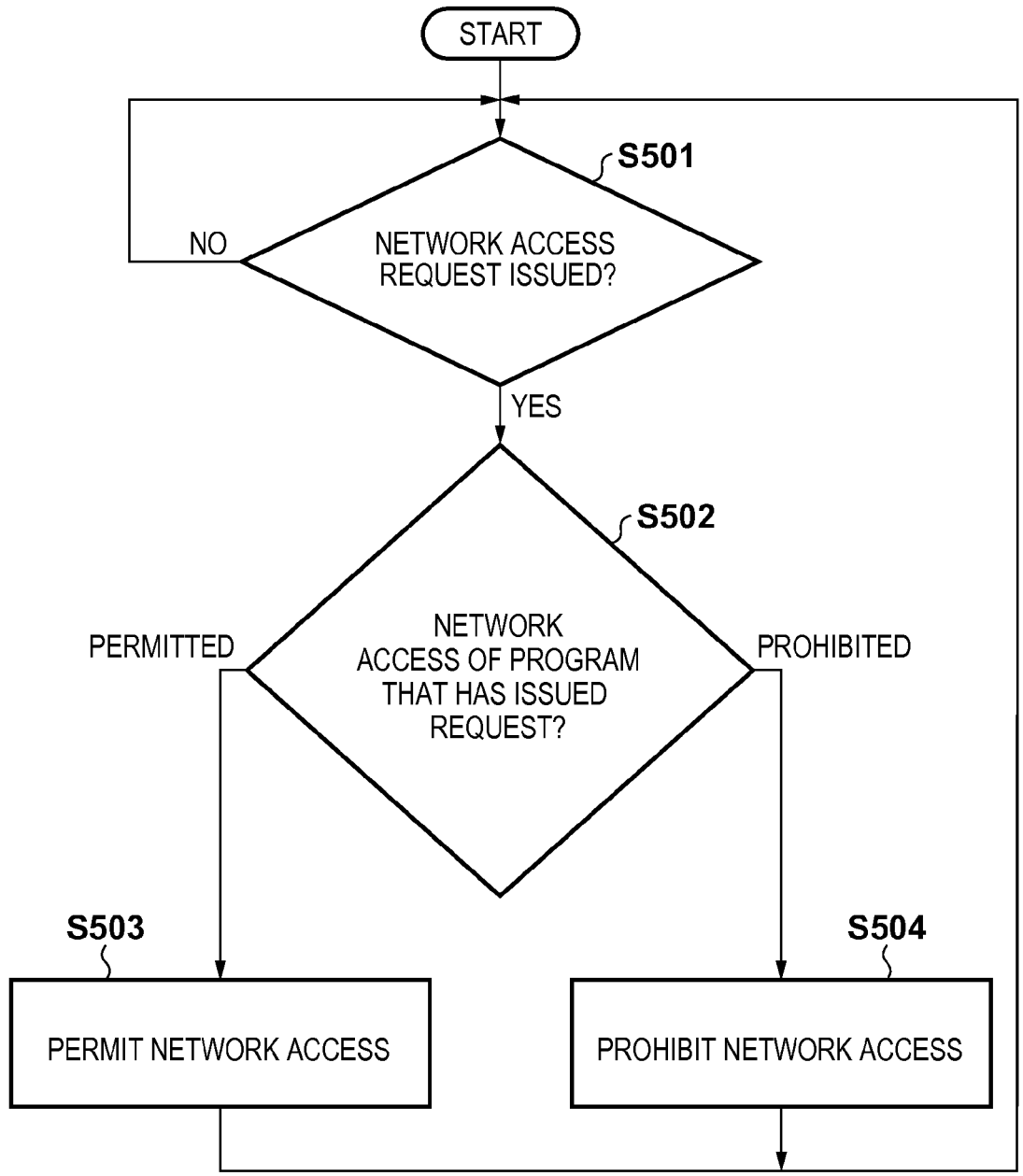
FIG. 13 is a flowchart for explaining network access control.

Network access control will be described with reference to the flowchart of FIG. 13. Network access control is executed by an arithmetic device 10C that executes the OS. Information (for example, ACL (Access Control List)) representing permission or prohibition of network access of each program is stored in the RAM of a memory 10E or a predetermined area of the storage device 10B as a table by the control program 113.

The arithmetic device 10C monitors network access by a program (step S501). When a program issues a network access request, the arithmetic device 10C refers to the ACL and determines permission or prohibition of network access of the program (step S502). Network access of the program is controlled in accordance with the determination result.

If network access of the program is permitted, the arithmetic device 10C permits network access (step S503). That is, a command or data issued by the program is transferred to a network I/F 10D, and data addressed to the program and received by the network I/F 10D is transferred to the program. Note that a restriction on the IP address or port number of the connection destination may be set in the ACL for each program. In this case, the arithmetic device 10C performs filtering in accordance with the restriction.

If network access of the program is prohibited, the arithmetic device 10C does not permit network access (step S504). That is, data transfer between the program and the network I/F 10D is not executed, an error message is returned to the network access request of the program.

[Creation of White List]

To operate the white list control system, the white list 120 suitable for the operation environment needs to be created.

Figure 11A:
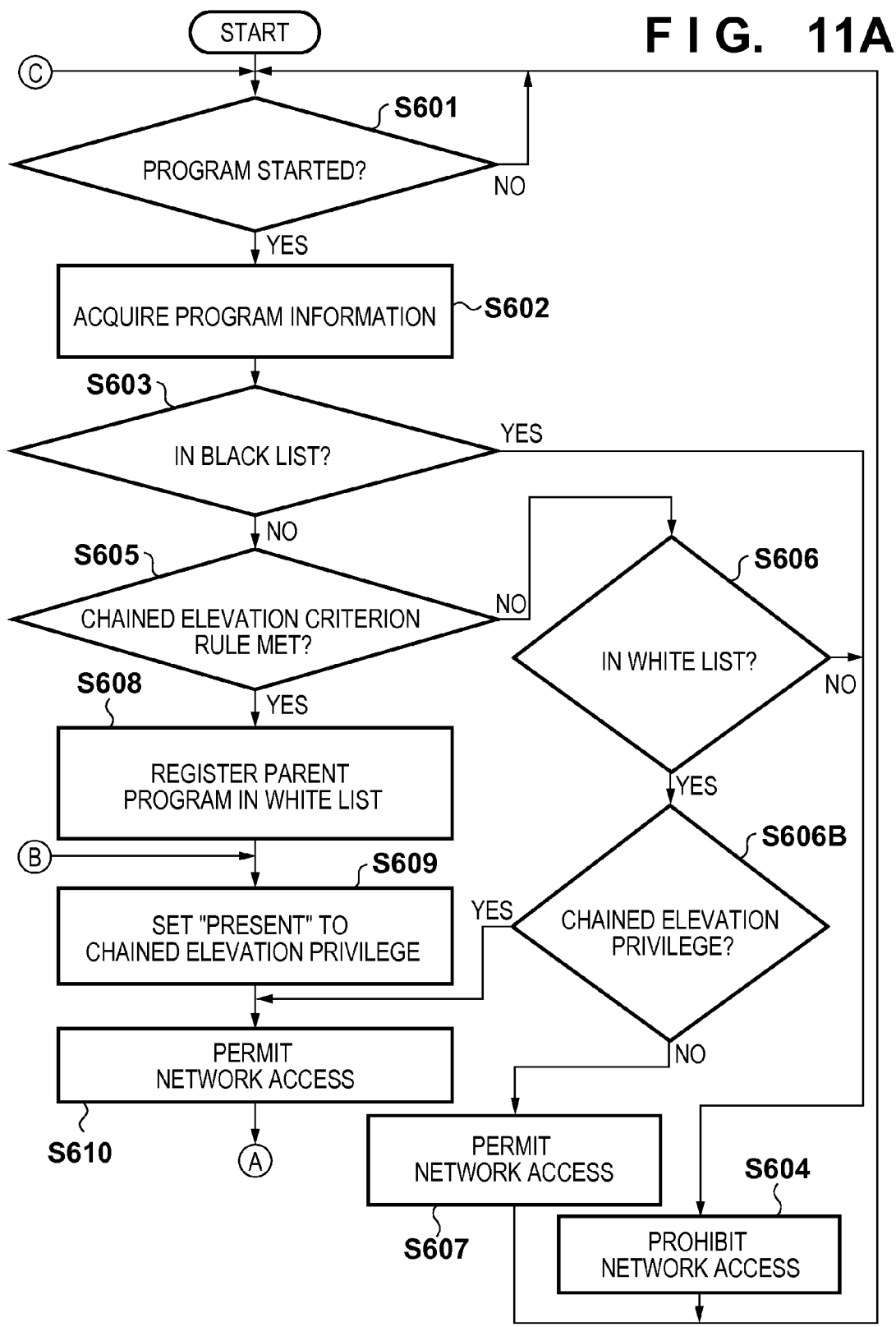
FIGS. 11A and 11B are flowcharts for explaining white list control processing according to the second embodiment.
Figure 11B:
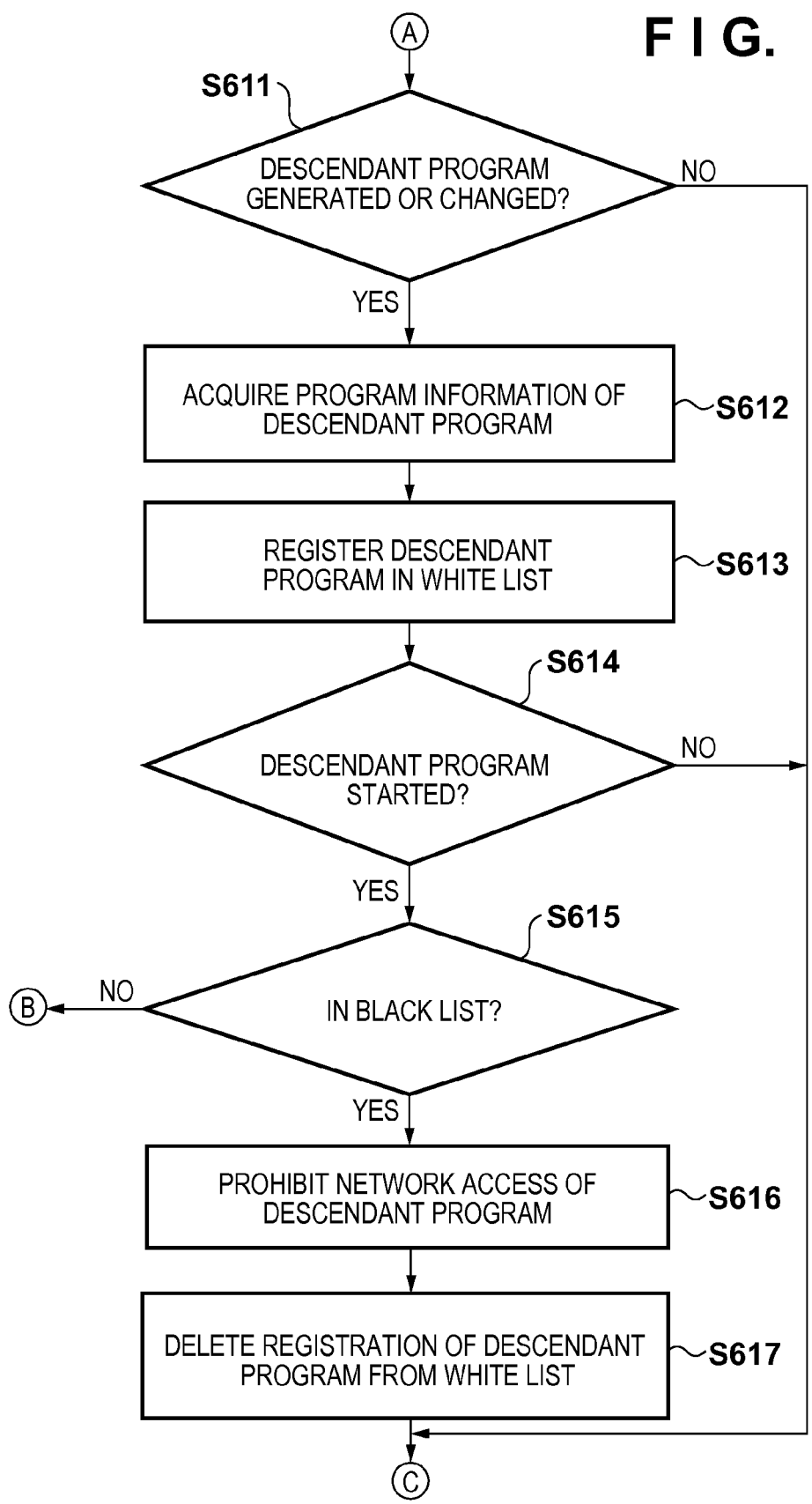

In FIGS. 11A and 11B, if a program neither meets the chained elevation criterion rule 130 nor exists in the white list 120 (NO in step S606), the control program 113 prohibits network access of the program (step S604), as described above. In FIG. 12, if a package neither meets the chained elevation criterion rule 130 nor exists in the white list 120 (NO in step S625), the control program 113 prohibits startup of the installer (step S623), as described above. However, if such a program or package (unregistered program) is found, it is possible to attempt to update the white list 120, as in the first embodiment. White list update processing according to the second embodiment is the same as white list update processing according to the first embodiment shown in FIGS. 7 and 8, and a detailed description thereof will be omitted.

[Modification]

An example has been described above in which no restriction is set on the IP address or port number of the connection destination in a record registered in the white list 120 by the registration program 111 (for example, third row in FIG. 9). However, for example, even if the program name does not change before and after update, if the program to be updated can be specified, the IP address or port number can be restricted to that of the same connection destination as the program before update. Note that the restriction can be imposed not by the IP address or port number but using terminal information such as a MAC address.

For example, processing of overwriting a program before update with a program after update or replacing a program before update with a program after update is detected, and the programs before and after update are associated with each other. Then, the white list 120 is updated based on this association. This makes it possible to register a record of the same setting as the program before update in the white list 120 and attain a securer white list update function. Details will be described below.

Updating White List Upon Detecting Overwrite

An example will be described in which when a process having chained elevation privilege overwrite-updates a program registered in the white list 120, the write processing of the process is monitored, thereby appropriately setting the white list 120. Note that the overwrite update corresponds to processing of, for example, overwriting data (file) before update with data (file) after update.

Figure 14:
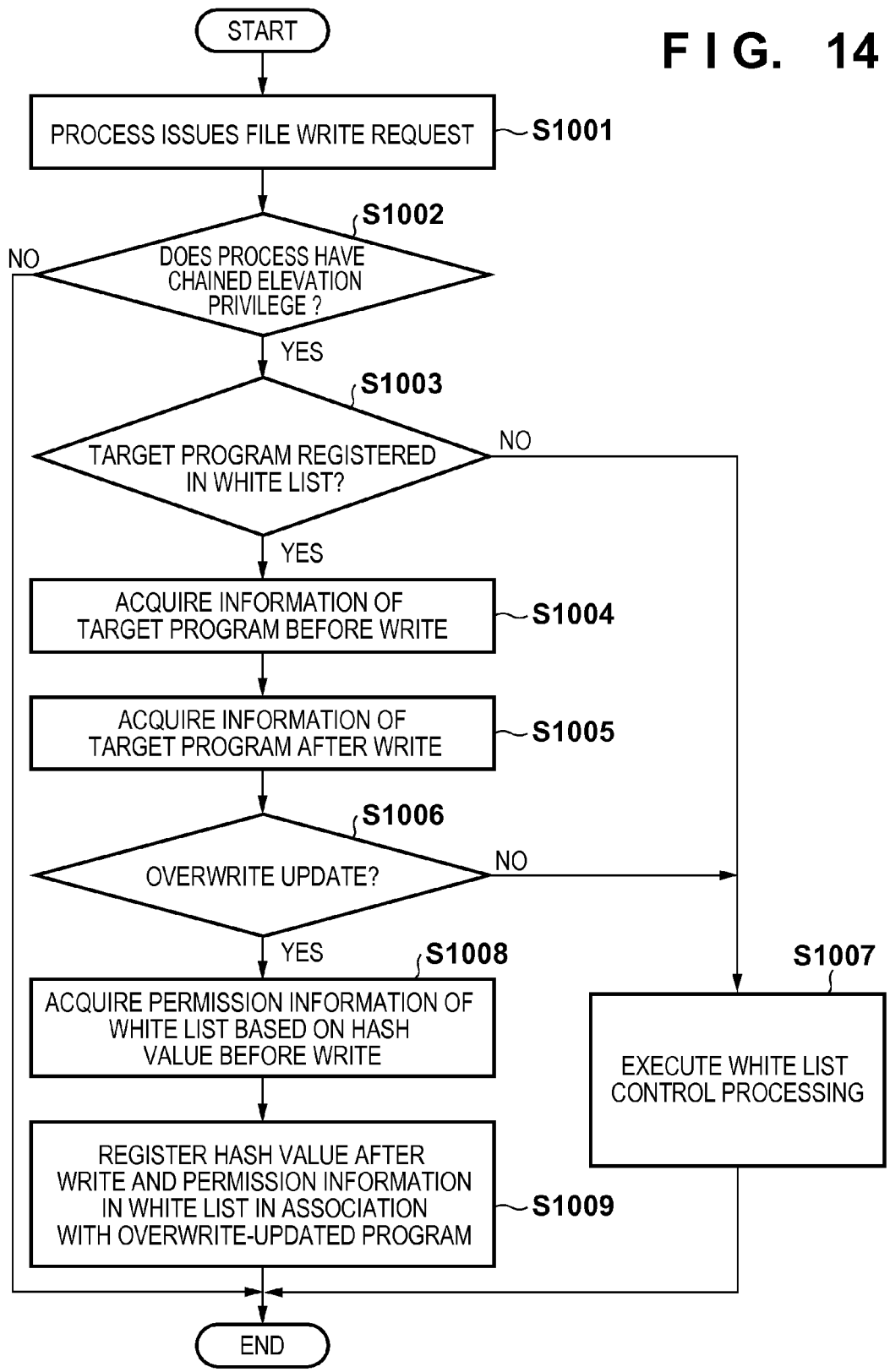
FIG. 14 is a flowchart for explaining white list update processing for program update via overwrite.

Update processing of the white list 120 by overwrite update will be described with reference to the flowchart of FIG. 14.

When a file write request is issued by an arbitrary process, the detection program 112 detects the write request (step S1001) and determines whether the process that has issued the write request has chained elevation privilege (step S1002). If the process does not have chained elevation privilege, the detection program 112 ends the processing for the write request and monitors a write request from the process again.

If the process that has issued the write request has chained elevation privilege, the identification program 110 specifies the write target program (to be referred to as a "target program" hereinafter) from the write request. The target program is specified from, for example, the file path and the file name. The hash value of the target program is acquired, and it is determined based on the hash value whether the target program is registered in the white list 120 (step S1003).

If the target program is not registered in the white list 120, the process advances to white list control processing shown in FIGS. 11A and 11B or FIG. 12 to add the target program to the white list 120 (step S1007), and the processing for the write request ends.

If the target program is registered in the white list 120, the identification program 110 acquires the information of the target program before write (step S1004). The acquired information includes, for example, a hash value, file path, signatory name, creator name, creation company name, and the like.

When the write by the process has ended, the identification program 110 acquires the information of the target program after write (step S1005). The acquired information includes, for example, a hash value, file path, signatory name, creator name, creation company name, and the like. The pieces of information of the target programs before and after write are compared, thereby determining whether overwrite update has been done (step S1006). This determination is done based on a condition, for example, whether the file paths are identical, whether the file names are identical, or whether the signatory names are identical. Either one or a plurality of determination conditions can be used.

Upon determining that overwrite update has not been done, the process advances to step S1007 described above. Upon determining that overwrite update has been done, the identification program 110 acquires permission information of the white list 120 based on the hash value before write (before overwrite update) (step S1008). The permission information includes, for example, chained elevation privilege, a connection destination port permitted to communicate, a connection destination IP address permitted to communicate, and the like (see FIG. 9).

The registration program 111 receives the hash value after write (after overwrite update) acquired in step S1005 and the permission information acquired in step S1008 from the identification program 110. The registration program 111 registers the hash value after overwrite update and the permission information in the white list 120 in association with the overwrite-updated target program (step S1009), and the processing for the write request ends.

The above-described processing enables update that continues the setting of the white list 120 before overwrite update. Note that in step S1009, the hash value and permission information before overwrite update may be deleted from the white list 120 or left in the white list 120. When the hash value and permission information before overwrite update remain in the white list 120, it is possible to restore the program before update in case of an error in the updated program or cope with a situation where another user has not executed the update.

Updating White List Upon Detecting Replacement

An example of overwrite update has been described above. Replacement update will be described below. The replacement update corresponds to processing of, for example, deleting or moving a file or changing a file name, and after that, creating or moving a file after update or changing a file name, thereby updating a program.

Figure 15:
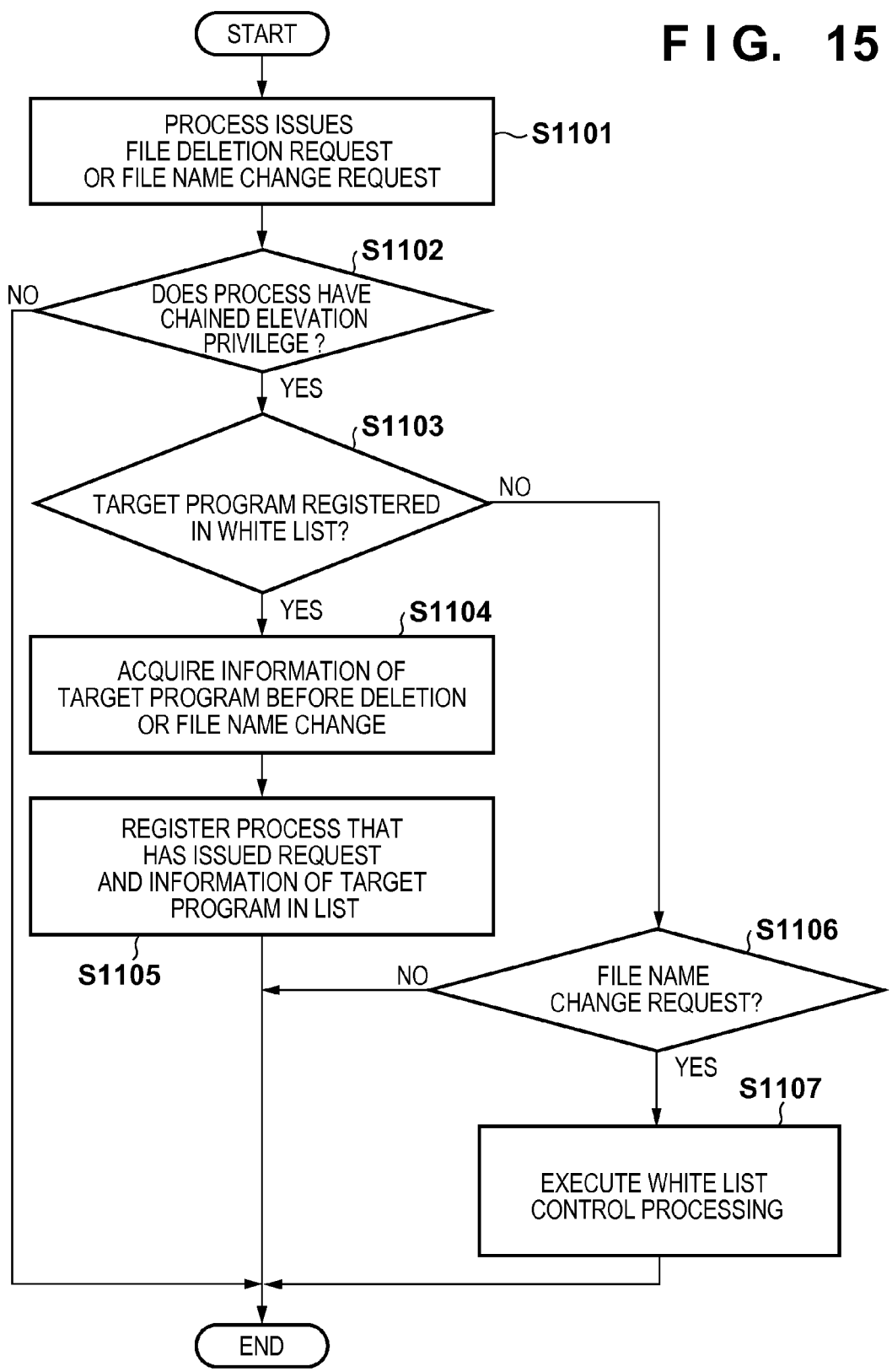
FIG. 15 is a flowchart for explaining white list update processing for program update via replacement.

Update processing of the white list 120 by replacement update will be described with reference to the flowchart of FIG. 15. FIG. 15 illustrates processing for an original file deletion request or file name change request.

When a file deletion request or file name change request is issued by an arbitrary process, the detection program 112 detects the deletion request or change request (to be referred to as a "request" hereinafter) (step S1101) and determines whether the process that has issued the request has chained elevation privilege (step S1102). If the process does not have chained elevation privilege, the detection program 112 ends the processing for the request and monitors a deletion request or change request from the process again.

If the process that has issued the request has chained elevation privilege, the identification program 110 specifies, from the request, the program (to be referred to as a "target program" hereinafter) to be deleted or change the file name. The target program is specified from, for example, the file path and the file name. The hash value of the target program is acquired, and it is determined based on the hash value whether the target program is registered in the white list 120 (step S1103).

If the target program is not registered in the white list 120, the identification program 110 determines whether the request is a file name change request (step S1106). If the request is not a file name change request (that is, deletion request), the identification program 110 ends the processing for the request, and the detection program 112 monitors a file deletion request or file name change request from the process again. If the request is a file name change request, the process advances to white list control processing shown in FIGS. 11A and 11B or FIG. 12 to add the target program to the white list 120 (step S1107), and the processing for the request ends.

If the target program is registered in the white list 120, the identification program 110 acquires the information of the target program before deletion or file name change (step S1104). The acquired information includes, for example, a hash value, file path, signatory name, creator name, creation company name, and the like.

The registration program 111 receives the process name and process ID of the process that has issued the request, the file name of the target program, and the information acquired in step S1104 from the identification program 110. The registration program 111 registers the received information in a list (step S1105), and the processing for the request ends. FIG. 16 shows an example of the list in which the registration program 111 registers the information.

Figure 17:
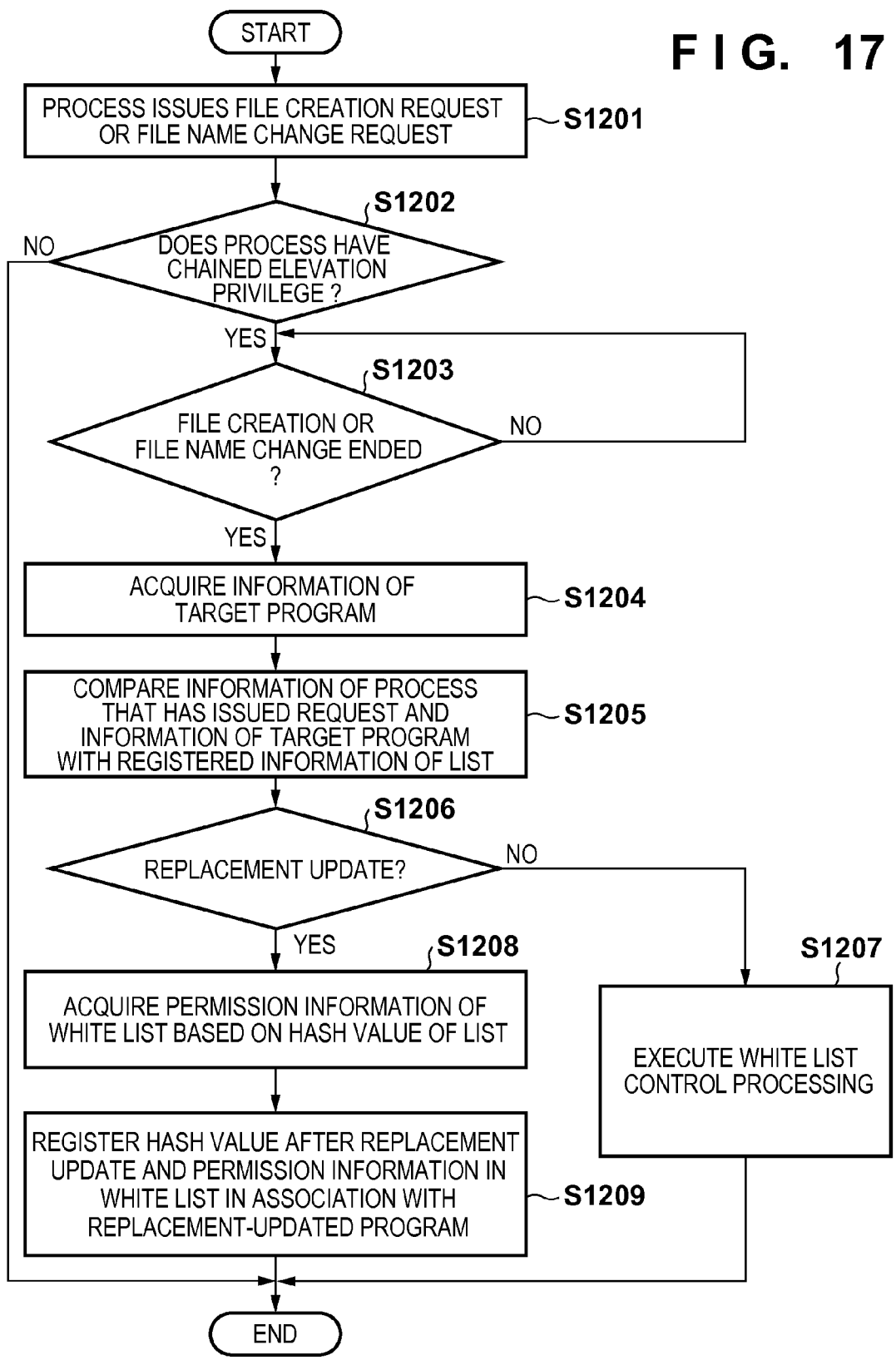
FIG. 17 is a flowchart for explaining white list update processing by replacement update.

Update processing of the white list 120 by replacement update will be described with reference to the flowchart of FIG. 17. FIG. 17 illustrates processing for a file creation request or file name change request.

When a file creation request or file name change request is issued by an arbitrary process, the detection program 112 detects the creation request or change request ("request") (step S1201) and determines whether the process that has issued the request has chained elevation privilege (step S1202). If the process does not have chained elevation privilege, the detection program 112 ends the processing for the request and monitors a creation request or change request from the process again.

If the process that has issued the request has chained elevation privilege, the identification program 110 determines whether file creation or file name change has ended (step S1203). If file creation or file name change has ended, information of the created file or the file whose file name has been changed ("target program") is acquired (step S1204). The acquired information includes, for example, file name, hash value, file path, signatory name, creator name, creation company name, and the like of the target program.

The identification program 110 compares the process name and process ID of the process that has issued the request and the information acquired in step S1204 with the registered information of the list shown in FIG. 16 (step S1205). It is determined whether replacement update has been done (step S1206). This determination is done based on a condition, for example, whether the process IDs are identical, whether the file paths are identical, whether the file names are identical, or whether the signatory names are identical. Either one or a plurality of determination conditions can be used.

Upon determining that replacement update has not been done, the process advances to white list control processing shown in FIGS. 11A and 11B or FIG. 12 to add the target program to the white list 120 (step S1207), and the processing for the request ends.

Upon determining that replacement update has been done, the identification program 110 acquires permission information of the white list 120 based on the hash value of a record corresponding to the target program in the list (step S1208). The permission information includes, for example, chained elevation privilege, a connection destination port permitted to communicate, a connection destination IP address permitted to communicate, and the like (see FIG. 9).

The registration program 111 receives the hash value of the target program after replacement update and the permission information acquired in step S1208 from the identification program 110. The registration program 111 registers the hash value after replacement update and the permission information in the white list 120 in association with the replacement-updated target program (step S1209), and the processing for the request ends.

The above-described processing enables update that continues the setting of the white list 120 before replacement update. Note that in step S1208, the hash value and permission information before replacement update may be deleted from the white list 120 or left in the white list 120. When the hash value and permission information before replacement update remain in the white list 120, it is possible to restore the program before update in case of an error in the updated program or cope with a situation where another user has not executed the update.

In the first and second embodiments, a PC, tablet terminal, and smartphone have been described as the examples of the client 10. However, the above-described processing can be applied using a terminal including no pointing device (for example, network scanner) or a terminal including no display (for example, embedded terminal) as a client.

In the first and second embodiments, the white list control system using a white list has been described. However, the present invention is not limited to the white list, and the above-described processing can also be applied to a black list control system using a black list.

The client 10 according to the first or second embodiment may have an operation history (not shown). Program information acquired by the identification program 110 and the like are recorded in the operation history as the operation history of the user. For example, concerning startup of a program, an execution file name (program name), hash value, version information, file size, file path, digital signature, permission/prohibition (success/failure) of program startup, and the like are recorded in the operation history. Concerning a network access request, an execution file name (program name), hash value, version information, file size, connection destination IP address, connection destination port number, permission/prohibition (success/failure) of network access, and the like are recorded in the operation history. A date/time when an action of a process was detected, and the like are also recorded in the operation history.

The server 20 according to the first or second embodiment may have an operation history (not shown). The control program 113 may transmit the operation history (data file) that the client 10 has to the server 20 periodically (for example, every other hour or every other day). The operation history transmitted from the client 10 may be recorded and managed in the operation history of the server 20 in association with the name or code of the client 10. Note that the control program 113 may transmit the operation history to the server 20 in real time.

If a program recorded in the operation history has not been started for a predetermined period (for example, one month), and the information of the program is included in the white list 120 or the white list master 220, the information may automatically be deleted.

OTHER EMBODIMENTS

The present invention is also implemented by executing the following processing. That is, software (program) that implements the functions of the above-described embodiments is supplied to the system or apparatus through a network or various kinds of storage media, and the computer (or CPU or MPU) of the system or apparatus reads out and executes the program.

The program may be executed by one computer or by a plurality of computers cooperatively.

The present invention is not limited to the above embodiments and various changes and modifications can be made within the spirit and scope of the present invention. Therefore, to apprise the public of the scope of the present invention, the following claims are made.

The invention claimed is:

1. An information processing apparatus comprising:
a detection unit configured to detect startup of a program and generation or change of the program, or search for the program;
an identification unit configured to identify the program; and
a registration unit configured to register the program in a white list or black list,
wherein the identification unit determines, based on program information of the program whose startup is detected by the detection unit or the program which is found in the search by the detection unit, whether or not the program meets a predetermined criterion regarding program information,
wherein the registration unit registers, in the white list or black list, the program determined to meet the predetermined criterion,
wherein at least one of the detection unit, the identification unit, or the registration unit is implemented using a processor,
wherein the registration unit registers a correspondence between the program determined to meet the predetermined criterion and chained elevation privilege in the white list in order to give the chained elevation privilege to the program, and
wherein when the detection unit detects generation or change of a child program by the program given the chained elevation privilege, the registration unit registers the child program in the white list.

2. The information processing apparatus according to claim 1, wherein the white list comprises a list of programs whose execution is permitted.

3. The information processing apparatus according to claim 2, wherein the black list comprises a list of programs whose execution is prohibited,
the identification unit determines whether or not the detected or found program is registered in the black list, and
the registration unit gives the chained elevation privilege to the detected or found program determined to be unregistered in the black list.

4. The information processing apparatus according to claim 3, wherein when the detection unit detects generation or change of a program of a next generation by the program given the chained elevation privilege, the identification unit determines, based on the program information of the program of the next generation, whether or not the program of the next generation is registered in the black list, and
the registration unit gives the chained elevation privilege to the program of the next generation determined to be unregistered in the black list.

5. The information processing apparatus according to claim 4, wherein the registration unit deletes, from the white list, registration of the program of the next generation determined to be registered in the black list.

6. The information processing apparatus according to claim 3, wherein when the detection unit detects startup of a program of a next generation by the program given the chained elevation privilege, the identification unit determines, based on the program information of the program whose startup is detected, whether or not the program is registered in the black list or whether or not the program is registered in the white list, and
the registration unit executes processing for registering, in the white list, the program determined to be unregistered in the black list or the program determined to be unregistered in the white list.

7. The information processing apparatus according to claim 3, further comprising a control unit configured to permit or prevent startup of the program based on the white list or black list.

8. The information processing apparatus according to claim 2, wherein when the detection unit detects generation or change of a program of a next generation by the program given the chained elevation privilege, the registration unit recursively repeats processing of registering the program of the next generation in the white list.

9. The information processing apparatus according to claim 8, wherein when the detection unit detects startup of the program of the next generation by the program given the chained elevation privilege, the registration unit gives the chained elevation privilege to the program of the next generation.

10. The information processing apparatus according to claim 9, wherein when the detection unit detects startup of a program of another next generation by the program of the next generation given the chained elevation privilege, the registration unit gives the chained elevation privilege to the program of the other next generation.

11. The information processing apparatus according to claim 2, wherein when the detection unit detects startup of an installer by the program given the chained elevation privilege, the registration unit gives the chained elevation privilege to the installer.

12. The information processing apparatus according to claim 2, wherein the registration unit gives the chained elevation privilege to a program generated from a program belonging to a generated program group stored in advance and started by a program belonging to a startup program group stored in advance.

13. The information processing apparatus according to claim 1, wherein the program information comprises a digital signature.

14. The information processing apparatus according to claim 1, wherein the white list comprises a list of programs whose network access is permitted.

15. The information processing apparatus according to claim 14, wherein the black list comprises a list of programs whose network access is prohibited,
the identification unit determines whether or not the detected or found program is registered in the black list, and
the registration unit gives the chained elevation privilege to the detected or found program determined to be unregistered in the black list.

16. The information processing apparatus according to claim 15, wherein when the detection unit detects generation or change of a program of a next generation by the program given the chained elevation privilege, the identification unit determines, based on the program information of the program of the next generation, whether or not the program of the next generation is registered in the black list, and
the registration unit gives the chained elevation privilege to the program of the next generation determined to be unregistered in the black list.

17. The information processing apparatus according to claim 16, wherein the registration unit deletes, from the white list, registration of the program of the next generation determined to be registered in the black list.

18. The information processing apparatus according to claim 15, wherein when the detection unit detects startup of a program of a next generation by the program given the chained elevation privilege, the identification unit determines, based on the program information of the program whose startup is detected, whether or not the program is registered in the black list or whether or not the program is registered in the white list, and the registration unit executes processing for registering, in the white list, the program determined to be unregistered in the black list or the program determined to be unregistered in the white list.

19. The information processing apparatus according to claim 15, further comprising a control unit configured to permit network access of the program based on the white list, and prohibit network access of the list.

20. The information processing apparatus according to claim 14, wherein when the detection unit detects generation or change of a program of a next generation by the program given the chained elevation privilege, the registration unit recursively repeats processing of registering the program of the next generation in the white list.

21. The information processing apparatus according to claim 20, wherein when the detection unit detects startup of the program of the next generation by the program given the chained elevation privilege, the registration unit gives the chained elevation privilege to the program of the next generation.

22. The information processing apparatus according to claim 21, wherein when the detection unit detects startup of a program of another next generation by the program of the next generation given the chained elevation privilege, the registration unit gives the chained elevation privilege to the program of the other next generation.

23. The information processing apparatus according to claim 14, wherein when the detection unit detects startup of an installer by the program given the chained elevation privilege, the registration unit gives the chained elevation privilege to the installer.

24. The information processing apparatus according to claim 14, wherein the registration unit gives the chained elevation privilege to a program generated from a program belonging to a generated program group stored in advance and started by a program belonging to a startup program group stored in advance.

25. The information processing apparatus according to claim 14, wherein the identification unit acquires setting information of a program associated with the program determined to meet the predetermined criterion, and the registration unit registers the program determined to meet the predetermined criterion and the setting information acquired by the identification unit in association with each other.

26. The information processing apparatus according to claim 1, wherein the registration unit registers, in the white list or black list, a program generated in accordance with a specific procedure or a program generated from a specific program.

27. An information processing system comprising:
the information processing apparatus according to claim 1; and
a server apparatus configured to transmit information regarding a white list or black list of programs to the information processing apparatus through a network.

28. The information processing system according to claim 27, wherein the server apparatus receives information regarding the program to be registered in the white list or black list from the information processing apparatus through the network.

29. The information processing system according to claim 28, wherein the white list comprises a list of programs whose execution is permitted, and the black list comprises a list of programs whose execution is prohibited.

30. The information processing system according to claim 28, wherein the white list comprises a list of programs whose network access is permitted, and the black list comprises a list of programs whose network access is prohibited.

31. An information processing method comprising:
using a processor to perform steps of:
detecting startup of a program and generation or change of the program, or searching for the program;
identifying the program; and
registering the program in a white list or black list,
wherein in the identifying step, it is determined, based on program information of the program whose startup is detected in the detecting step or the program which is found in the search in the detecting step, whether or not the program meets a predetermined criterion,
wherein in the registering step, the program determined to meet the predetermined criterion is registered in the white list or black list,
wherein the registering step registers a correspondence between the program determined to meet the predetermined criterion and chained elevation privilege in the white list in order to give the chained elevation privilege to the program, and
wherein when the detecting step detects generation or change of a child program by the program given the chained elevation privilege, the registering step registers the child program in the white list.

32. A non-transitory computer readable medium storing a computer-executable program for causing a computer to execute an information processing method comprising the steps of:
detecting startup of a program and generation or change of the program, or searching for the program;
identifying the program; and
registering the program in a white list or black list,
wherein in the identifying step, it is determined, based on program information of the program whose startup is detected in the detecting step or the program which is found in the search in the detecting step, whether or not the program meets a predetermined criterion,
wherein in the registering step, the program determined to meet the predetermined criterion is registered in the white list or black list,
wherein the registering step registers a correspondence between the program determined to meet the predetermined criterion and chained elevation privilege in the white list in order to give the chained elevation privilege to the program, and
wherein when the detecting step detects generation or change of a child program by the program given the chained elevation privilege, the registering step registers the child program in the white list.

* * * * *